United States Patent
Furukawa et al.

(10) Patent No.: US 11,041,082 B2
(45) Date of Patent: Jun. 22, 2021

(54) IMAGE FORMING METHOD, IMAGE FORMING DEVICE, AND RECORDED MATTER

(71) Applicants: Juichi Furukawa, Kanagawa (JP); Tatsuya Tomura, Tokyo (JP)

(72) Inventors: Juichi Furukawa, Kanagawa (JP); Tatsuya Tomura, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 203 days.

(21) Appl. No.: 16/292,383

(22) Filed: Mar. 5, 2019

(65) Prior Publication Data
US 2019/0276692 A1  Sep. 12, 2019

(30) Foreign Application Priority Data
Mar. 7, 2018  (JP) .............................. JP2018-040587

(51) Int. Cl.
| | |
|---|---|
| *C09D 11/322* | (2014.01) |
| *C09D 11/38* | (2014.01) |
| *B41J 11/00* | (2006.01) |
| *B41M 5/50* | (2006.01) |
| *B41M 5/00* | (2006.01) |
| *B41J 2/21* | (2006.01) |
| *C09D 11/40* | (2014.01) |

(52) U.S. Cl.
CPC .......... *C09D 11/322* (2013.01); *B41J 2/2117* (2013.01); *B41J 11/002* (2013.01); *B41M 5/0047* (2013.01); *B41M 5/504* (2013.01); *C09D 11/38* (2013.01)

(58) Field of Classification Search
None
See application file for complete search history.

(56) References Cited

U.S. PATENT DOCUMENTS

| | | | | |
|---|---|---|---|---|
| 10,300,706 B2* | 5/2019 | Miyazawa | ............. | B41J 2/2107 |
| 2007/0076069 A1* | 4/2007 | Edwards | ............. | C09D 11/322 |
| | | | | 347/100 |
| 2008/0182083 A1* | 7/2008 | Oyanagi | ............. | C09D 11/322 |
| | | | | 428/195.1 |
| 2008/0182085 A1* | 7/2008 | Oyanagi | ............... | C09D 11/36 |
| | | | | 428/195.1 |

(Continued)

FOREIGN PATENT DOCUMENTS

| | | |
|---|---|---|
| JP | 2005-119013 | 5/2005 |
| JP | 2008-208330 | 9/2008 |

(Continued)

OTHER PUBLICATIONS

English translation of JP 2012/196893, Oct. 2012; 39 pages.*

*Primary Examiner* — Helene Klemanski
(74) *Attorney, Agent, or Firm* — Oblon, McClelland, Maier & Neustadt, L.L.P.

(57) ABSTRACT

An image forming method comprises applying a white ink containing a metal oxide having a number average particle diameter of from 200 to 700 nm and a polymer to a recording medium and applying a glittery ink containing a glittery pigment to an area on the recording medium where the white ink has been applied, wherein the following relation 1 is satisfied:

$$0.6 \leq V_p/(V_p+V_e) \quad \text{Relation 1,}$$

where Vp represents a volume of the metal oxide in the white ink and Ve represents a volume of the polymer in the white ink.

12 Claims, 1 Drawing Sheet

(56) References Cited

U.S. PATENT DOCUMENTS

| | | | |
|---|---|---|---|
| 2008/0213518 A1* | 9/2008 | Oyanagi | B41J 2/01 428/34.1 |
| 2009/0220695 A1* | 9/2009 | Oyanagi | C09D 11/54 427/256 |
| 2011/0036266 A1* | 2/2011 | Oyanagi | C09D 11/36 106/31.65 |
| 2011/0135893 A1* | 6/2011 | Oyanagi | D06P 5/30 428/196 |
| 2012/0006224 A1* | 1/2012 | Oyanagi | C09D 11/36 106/31.65 |
| 2012/0040147 A1* | 2/2012 | Komatsu | C09D 11/322 428/195.1 |
| 2012/0274715 A1* | 11/2012 | Oyanagi | C09D 11/36 347/100 |
| 2014/0220319 A1* | 8/2014 | Koike | B41M 7/009 428/207 |
| 2018/0056692 A1 | 3/2018 | Tomura et al. | |
| 2018/0118966 A1 | 5/2018 | Tomura et al. | |
| 2018/0178538 A1* | 6/2018 | Miyazawa | C09D 11/32 |
| 2019/0030940 A1* | 1/2019 | Tomura | B41M 5/0023 |

FOREIGN PATENT DOCUMENTS

| | | |
|---|---|---|
| JP | 2008-208332 | 9/2008 |
| JP | 2011-252169 | 12/2011 |
| JP | 2012-196893 | 10/2012 |
| JP | 2013-256665 | 12/2013 |
| JP | 2016-000815 | 1/2016 |

\* cited by examiner

IMAGE FORMING METHOD, IMAGE FORMING DEVICE, AND RECORDED MATTER

CROSS-REFERENCE TO RELATED APPLICATIONS

This patent application is based on and claims priority pursuant to 35 U.S.C. § 119 to Japanese Patent Application No. 2018-040587, filed on Mar. 7, 2018, in the Japan Patent Office, the entire disclosure of which is hereby incorporated by reference herein.

BACKGROUND

Technical Field

The present invention relates to an image forming method, an image forming device, and printed matter.

Description of the Related Art

Printing media are diversifying. In consequence, printing media are now used in many fields, from printing in office to large-scale printing such as commercial printing.

Printed matter including the printing medium can represent a full color image obtained by mixing various colors on the printing medium. Printed matter having a metallic luster image including a silver coloring material, which particularly has excellent mirror surface image clarity, is widely applicable in industrial fields because a full color image having a high mirror surface image clarity can be obtained when the silver coloring material is mixed with other colors.

In view of this, a method has been proposed which includes forming an undercoat layer by applying a resin ink to a recording medium and thereafter applying a glittery pigment ink to the undercoat layer to form a metallic luster image.

SUMMARY

According to the present disclosure, provided is an improved image forming method which comprises applying a white ink containing a metal oxide having a number average particle diameter of from 200 to 700 nm and a polymer to a recording medium and applying a glittery ink containing a glittery pigment to an area on the recording medium where the white ink has been applied, wherein the following relation 1 is satisfied:

$$0.6 \leq Vp/(Vp+Ve) \qquad \text{Relation 1,}$$

where Vp represents a volume of the metal oxide in the white ink and Ve represents a volume of the polymer in the white ink.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
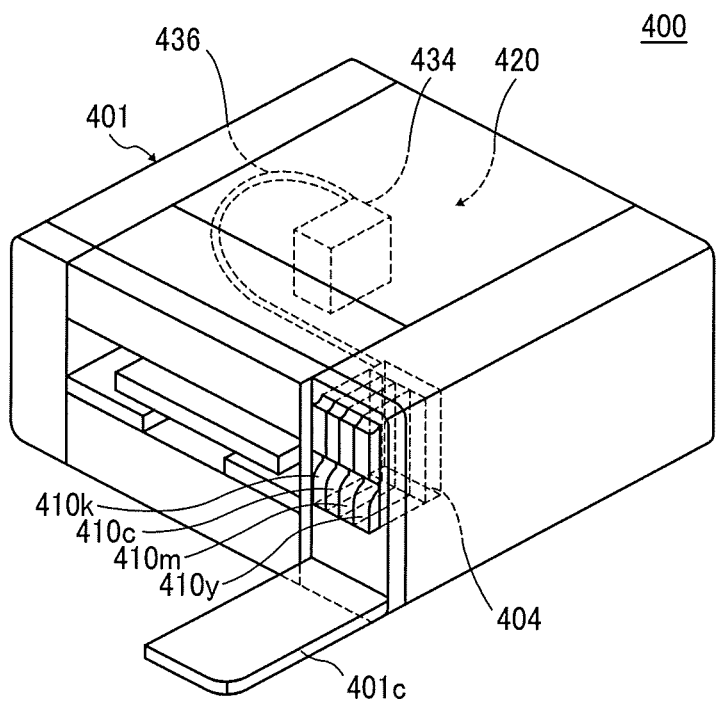
FIG. 1 is a diagram illustrating an example of an image forming device conducting the image forming method according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Image Forming Method and Image Forming Device

The image forming method of the present disclosure includes a white ink applying step, a glittery ink applying step, preferably a drying step, and other optional steps.

The image forming device of the present disclosure includes a white ink applying device, a glittery ink applying device, preferably a drying device, and other optional devices.

In general, glittery pigments easily precipitate in a typical image forming method. Therefore, a polymer such as a water-soluble resin or a water-soluble polymer is optionally added to the glittery ink as a dispersant to enhance dispersion stability of the glittery pigment. However, metallic luster and image clarity are lost since a large amount of the dispersant, etc. in the glittery ink remain in the surface layer of a glittery image. The mechanism of not capable of obtaining an image having excellent metallic luster and image clarity is inferred that the dispersant taken in the image layer as a solid content attenuates the reflectance and if a metal pigment is used as the glittery pigment, it acts as an insulative resistance that impedes electric conductivity between the metal pigment particles.

Also, the coloring of metallic luster by the glittery ink depends on the color of the undercoat in the area where the glittery ink is applied.

In particular, for a recording medium with no receiving layer, so-called impermeable substrate, the dispersant such as a polymer in the glittery ink remains on the image surface without being absorbed in the recording medium. This degrades metallic luster and image clarity.

According to an embodiment of the present invention, which will be described later, an image forming method, an image forming device, and recorded matter are provided which can obtain a glittery image having excellent metallic luster and image clarity for various types of recording media, including a recording medium with no ink receiving layer.

Using the white ink of the present disclosure, appropriate voids can be formed in a white image area. This is inferred that due to the relation between the volume Vp of the metal oxide in the white ink and the volume Ve of the polymer in the white ink, which is Vp≥Ve, as the white ink applied to the recording medium is dried, such voids appear between particles of the metal oxide.

Furthermore, since the white ink for use in the present disclosure satisfies the following relation: 0.6≤Vp/(Vp+Ve), a white image can be inferentially formed in which voids appearing between particles of the metal oxide are optimized. Therefore, the white image formed by using the ink for use in the present disclosure is considered to have a porous structure including many voids.

When a glittery image is formed by applying the glittery ink to the white image area, the polymer contained in the glittery ink permeates the voids appearing in the white image area. Consequently, the proportion of the polymer in the glittery image to the glittery pigment in the glittery image is reduced so that an image having excellent metallic luster and image clarity is considered to be provided.

In the glittery ink for use in the image forming method of the present disclosure, since the polymer in the glittery ink permeates a white image layer through a glittery image layer, the polymer is removed even if the glittery ink is so formulated as to contain a larger amount of the polymer in order to improve dispersibility and fixability. As a result, an image having excellent image clarity and glossiness is obtained.

In other words, the glittery ink for use in the present disclosure can have both a high dispersion stability owing to the formulation design of the ink and excellent metallic luster and image clarity of a glittery image formed by using the glittery ink at the same time.

In addition, a white image formed with the white ink for use in the present disclosure has high whiteness and concealing property. This is inferred that the white image formed with the white ink for use in the present disclosure has porosity and the solid-gas interface between the metal oxide and the void has a high refractive index.

Therefore, the glittery image and recorded matter of the present disclosure formed by the image forming method of the present disclosure have excellent metallic luster and image clarity and are also little or never influenced by the color peculiar to the recording medium on which the glittery image is formed or a transmitted light, which makes the color phase stable.

White Ink Applying Process and White Ink Applying Device

In the white ink applying process, a white ink is applied onto a recording medium by a white ink applying device.

The white ink applying device applies a white ink onto a recording medium. Exemplary devices include, but are not limited to, an inkjet device using an inkjet head, a device using a flexo printing method, and a device using a bar coater.

Specific examples of other white ink printing methods include, but are not limited to, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, a die coating method, and spray coating method.

As an embodiment, if the white ink is applied to the entire surface of a recording medium, the white ink may be applied by a method other than the inkjet method and the glittery ink may be applied onto the white image by the inkjet method.

In another embodiment, both the white ink and the glittery ink may be applied to a recording medium by the inkjet method, or alternatively, by a method other than the inkjet method.

White Ink

The white ink for use in the present disclosure contains a metal oxide having a number average particle diameter (size) of from 200 to 700 nm and a polymer, and satisfies the following relation 1.

$$0.6 \leq V_p/(V_p+V_e) \quad \text{Relation 1}$$

In Relation 1, Vp represents the volume of the metal oxide in the white ink and Ve represent the volume of the polymer in the white ink.

The metal oxide, the polymer, an organic solvent, water, and additives such as a defoaming agent, a preservatives and fungicides, a pH regulator, and a surfactant for use in the white ink are described below.

Metal Oxide

In the white ink for use in the present disclosure, a metal oxide (metal oxide pigment) is used as a white coloring material (white pigment). The whiteness of the metal oxide is defined by, for example, ISO-2469 regulation and JIS-8148 format. Generally, a metal oxide having a whiteness value of 70 or more is used as the pigment in white ink.

Specific examples of the metal oxide include, but are not limited to, titanium oxide, iron oxide, tin oxide, zirconium oxide, and iron titanate, which is a composite oxide of iron and titanium. Of these, titanium oxide is preferable in terms that titanium oxide has a high refractive index and has a high whiteness.

Since titanium oxide has a high refractive index, a white ink containing a pigment having titanium oxide as the core component has excellent whiteness in comparison with other metal oxides.

The white ink having a metal oxide as the pigment has a larger refractive index at the pigment-polymer interface and the pigment-air interface than the white ink having a resin such as a hollow resin. Therefore, the white image formed with the white ink having a metal oxide as the pigment has better concealing property and a higher whiteness.

The metal oxide has a number average particle diameter (size) of from 200 to 700 nm. If the number average particle diameter is less than 200 nm, the pigment has a poor whiteness because the light as reflected by the pigment has a visible light wavelength range. As the number average particle diameter of the metal oxide increases, a white image having a high porosity can be easily formed, which enhances the whiteness. If the number average particle diameter of the metal oxide is larger than 700 nm, the surface of the white image is roughened, thereby reducing glittery feeling. In other words, such a metal oxide has an adverse impact on the glittery ink applied onto a white image which has been formed with the white ink containing the metal oxide having a number average particle diameter greater than 700 nm. As a consequence, image clarity of the glittery image deteriorates.

The metal oxide has a number average particle diameter of from 200 to 700 nm, preferably from 250 to 500 nm, more preferably from 250 to 420 nm, and furthermore preferably from 290 to 400 nm. If the metal oxide has a number average particle diameter of from 200 to 700 nm, the white image has appropriate whiteness, porosity, and pore size, so that the glittery pigment in a glittery image formed on the white image does not permeate the voids of the white image, thereby obtaining a glittery image having excellent metallic luster and image clarity.

If the white ink is applied to a recording medium by an inkjet method, the number average particle diameter of the metal oxide is preferably 400 nm or less. If the number average particle size of the pigment in the white ink is 400 nm or less, the white ink is secured to be stably discharged.

If the white ink is applied to a recording medium by an inkjet method, the number average particle diameter of the metal oxide is preferably from 200 to 400 nm, more preferably from 250 to 400 nm, and furthermore preferably from 290 to 400 nm, and particularly preferably from 290 to 340 nm. If the number average particle diameter is within the range of from 200 to 400 nm, whiteness of the white image formed with the white ink and discharging stability of the white ink strike a balance.

For printing with the white ink by a method other than the inkjet method, a white ink containing a metal oxide with a number average particle diameter not less than 400 nm can be used. With a white ink that contains a pigment having a number average particle diameter not less than 400 nm, a white image having a higher whiteness can be formed.

The number average particle diameter of the metal oxide in the white ink can be measured using a laser analysis/scattering method (micro-track method), a dynamic light scattering method (nano-track method), etc., For example, a particle size analyzer (Nanotrac Wave II UT151 manufactured by MicrotracBEL Corp.) can be used for measuring Ratio of Pigment to Polymer In the white ink for use in the present disclosure, Vp≥Ve is satisfied, where Vp represents the volume of the metal oxide contained in the white ink and Ve represents the volume of the polymer contained in the white ink.

When the white ink for use in the present disclosure is dried to form a white image, the polymer takes an amorphous form while the metal oxide has a regular form. Therefore, the polymer fills the gap between the metal oxide particles when forming the white image. At this point, voids suitably appear in the white image layer when $0.6 \leq Vp/(Vp+Ve)$ is satisfied. Due to these voids, concealing property of the white image is enhanced.

This is because the refractive index is much higher at the pigment-air interface and the polymer-air interface than at the pigment-polymer interface, which significantly enhances the concealing property of the white image.

The volume ratio of air in the white image (void ratio in the white image) tends to be higher as the particle diameter of the metal oxide in the white image increases. In addition, the white image tends to thicken and the void ratio easily increases as the pigment concentration (concentration of metal oxide) increases.

Due to the void appearing in the white image layer, the polymer in a glittery image formed on the white image permeates the void, whereby the metallic luster and image clarity of the glittery image are enhanced.

The relation between Vp and Ve is $0.6 \leq Vp/(Vp+Ve)$, preferably $0.60 \leq Vp/(Vp+Ve) \leq 0.93$, more preferably $0.60 \leq Vp/(Vp+Ve) \leq 0.90$, and furthermore preferably $0.65 \leq Vp/(Vp+Ve) \leq 0.90$, and particularly preferably $0.74 \leq Vp/(Vp+Ve) \leq 0.81$. When $0.60 \leq Vp/(Vp+Ve) \leq 0.93$, fixability of the formed image is improved.

The upper limit of Vp/(Vp+Ve) is inevitably less than one.

Whether or not Vp (the volume of the metal oxide contained in the white ink) and Ve (the volume of the polymer contained in the polymer) each comply with the requisites of the present disclosure can be determined by, for instance, calculating Vp and Ve according to the method described below.

The volumes Vp and Ve are obtained for the case in which the metal oxide contained in the white ink is titanium oxide and the polymer contained in the white ink is a urethane resin, The density of titanium oxide (rutile type) is 4.26 g/cm$^3$, and the density of a general urethane resin is 1.2 g/cm$^3$. When Mp represents the weight concentration of titanium oxide in the white ink and Me represents the weight concentration of the urethane resin in the white ink, Vp and Ve each satisfy the relations: Vp=Mp/4.26 and Ve=Me/1.2. The calculated values are assigned in the relation 1 and whether or not (Mp/4.26)/((Mp/4.26)+(Me/1.2))≥0.6 is satisfied is checked.

According to this calculation method, whether or not the volumes comply with the requisites of the present disclosure can be determined based on the pigment type, the polymer type, and the contents of the pigment and polymer in the white ink.

The proportion of the metal oxide in the total volume of the solid content in the white ink is preferably 50 percent by volume or more, more preferably from 50 to 81 percent by volume, and furthermore preferably from 59 to 74 present by volume. When the volume of the metal oxide is not less than 50 percent by volume of the total volume of the solid content in the white ink, the whiteness of the white image is further improved. When it is not more than 81 percent by volume, fixability of the white image to the recording medium is further improved.

The volume of the metal oxide in the white ink can be obtained by the following method, for instance.

First, the metal oxide is isolated from the white ink by, for instance, centrifugal separation, and the elemental composition of the metal oxide is identified using SEM-EDS, etc. Such an element as a coating element that is used in a small amount is excluded from the composition of the metal oxide. Initially, the density of the metal oxide is determined from the identified elements. Next, 50 mg of the white ink is placed in a crucible and heated at 500 degrees C. By heating the white ink at 500 degrees C., the solvent contained in the white ink boils and volatilizes, and the polymer contained in the white ink is carbonized and burnt off. At this point, the residue in the crucible is regarded as the metal oxide in the white ink, and the mass of the metal oxide is measured. The measured mass of the metal oxide is divided by the density to obtain the volume of the metal oxide in the white ink.

The solid content is isolated from the white ink into the metal oxide, the polymer, etc. using a centrifuge, to obtain each volume ratio from the thus-obtained respective solid contents.

The metal oxide concentration can be calculated from the density of the centrifugally separated metal oxide and the metal oxide volume obtained as a result of the separation of the metal oxide.

In addition, a white image cross-section of the recorded matter is subjected to component analysis using SEM-EDS, etc., to obtain the distribution of the metal oxide, other solid components, and the voids in the white image cross-section, and the distribution area ratios of the respective components in the white image are analyzed and calculated to obtain the ratio of the metal oxide in the solid content.

Assuming that the content of the metal oxide in the white ink is A (percent by mass) and the number average particle diameter of the metal oxide in the white ink is B (nm), the ratio (AB) of the content to the number average particle diameter is preferably from 1/20 to 1/10. If A/B is from 1/20 to 1/10, a white image having an excellent whiteness is obtained.

In a case where an inkjet method is employed for printing with the white ink, the proportion of the metal oxide in the white ink is preferably from 15 to 30 percent by mass, more preferably from 15 to 25 percent by mass, and furthermore preferably from 18 to 25 percent by mass. If the content of the metal oxide in the white ink is 15 percent by mass or more, the whiteness is improved. With a content of 30 percent by mass or less, the discharge stability is improved.

In a case where an analogue printing method is employed for printing with the white ink, the proportion of the metal oxide in the white ink may be 30 percent by mass or more, preferably from 15 to 50 percent by mass, and more preferably from 20 to 45 percent by mass. If the proportion of the metal oxide in the white ink is 15 percent by mass or more, the whiteness is improved. With a content of 50 percent by mass or less, the fixability of a white image is improved.

Polymer

The white ink for use in the present disclosure contains a polymer. Examples of the polymer include, but are not limited to, an amphiphatic polymer, an oligomer, a resin, a water-soluble resin, and a water-soluble polymer. It is suitable to use a polymer having a film-forming action, a water-soluble resin having a power of dispersing a pigment in an aqueous medium, and a water-soluble polymer.

The polymer having a film-forming action enhances fixability of ink to a recording medium. In particular, for a transparent or translucent recording medium, an impermeable medium tends to be used. When an image is formed on such an impermeable medium, a white ink tends to be used for an undercoat in order to improve the color development of a color image including a glittery image.

Since an aqueous ink is poorly fixed onto an impermeable medium, fixability of the white ink used for an undercoat is required.

It is also desirable that the ink contain a polymer effective as a dispersant. Such a polymer is also effective to reduce the precipitation speed of a pigment and delay caking, owing to the improvement of dispersibility of the pigment. The polymer preferably has a small particle diameter in terms of dispersibility. More preferably, the polymer is soluble in a vehicle. It should be noted that a polymer with a higher zeta potential per polymer weight or polymer volume has a better dispersing effect per unit amount.

A polymer particulate dispersible in a solvent for use in the ink is preferable because fixability is improved. In addition, a polymer soluble in a vehicle is suitable because polymer dispersibility can be improved. These polymers can be used alone or in combination of two or more thereof. Considering striking a balance between adhesion and dispersibility of a pigment, it is preferable to contain both a polymer dispersible in a solvent for use in the ink and a polymer soluble in a solvent for use in the ink.

Moreover, it is preferable that the volume ratio of the polymer in the ink be less than that of the pigment in the ink.

The ratio of the polymer volume to the total solid content volume of the ink is 0.1 to 0.49.

In order to secure discharging stability of ink for use in the inkjet method, the proportion of the polymer in the solid content in the ink is preferably 35 percent by mass or less and more preferably 30 percent by mass or less.

Amphiphatic Polymer

An amphiphatic polymer (polymer dispersant) includes a hydrophilic unit (or a hydrophilic block) composed of a hydrophilic monomer.

Examples of the hydrophilic monomer include, but are not limited to, an addition-polymerizable monomer, such as a carboxyl group- or acid anhydride group-containing monomer and a hydroxyl group-containing monomer, and a condensation polymerizable monomer such as an alkylene oxide (e.g., ethylene oxide).

Examples of the acid anhydride group-containing monomer include, but are not limited to, a (meth)acrylic monomer, such as acrylic acid and methacrylic acid, an unsaturated polycarboxylic acid such as maleic acid, and maleic anhydride.

Specific examples of the hydroxy group-containing monomer include, but are not limited to, hydroxyalkyl (meth)acrylate such as 2-hydroxyethyl (meth)acrylate, and vinylphenol.

The condensation polymerizable monomer may form a hydrophilic unit through reaction with an active group (for example, hydroxyl group-containing monomers) such as hydroxyl group.

The hydrophilic monomers may be used alone or in combination of two or more thereof to form a hydrophobic unit.

At least, the amphiphatic polymer includes a hydrophilic unit (or hydrophilic block). It can be a mono polymer or copolymer of a hydrophilic monomer (for example, polyacrylic acid or a salt thereof). Also, like the styrene-based resins or acrylic resins specified above, it can be a copolymer of a hydrophilic monomer and a hydrophobic monomer.

Examples of the hydrophobic monomer (nonionic monomer) include, but are not limited to, a (meth)acrylic monomer such as a (meth)acrylate ester; a styrenic monomer such as styrene, α-methylstyrene, and vinyltoluene; a monomer based on an a-olefin with 2 to 20 carbon atoms; and a vinyl carboxylate ester monomer such as vinyl acetate and vinyl butyrate. Such hydrophobic monomers may be used alone or in combination of two or more thereof to form a hydrophobic unit.

Specific examples of the (meth)acrylate ester include, but are not limited to, a (meth)acrylate ester of an alkyl with 1 to 20 carbon atoms, such as methyl (meth)acrylate, ethyl (meth)acrylate, n-butyl (meth)acrylate, 2-ethylhexyl (meth)acrylate, lauryl (meth)acrylate, and stearyl (meth)acrylate; a cycloalkyl (meth)acrylate such as cyclohexyl (meth)arylate; an aryl (meth)acrylate such as phenyl (meth)acrylate; and an aralkyl (meth)acrylate such as benzyl (meth)acrylate and 2-phenylethyl (meth)arylate.

Specific examples of the monomer based on an a-olefin with 2 to 20 carbon atoms include, but are not limited to, ethylene, propylene, 1-butene, isobutylene, 1-hexene, 1-octene, and 1-dodecene When the amphiphatic polymer is a copolymer, for example, a copolymer of a hydrophilic monomer and a hydrophobic monomer, the copolymer is allowed to be a random copolymer, an alternate copolymer, a block copolymer (for example, a copolymer of a hydrophilic block constituted of a hydrophilic monomer and a hydrophobic block constituted of a hydrophobic monomer), or a comb copolymer (or comb graft copolymer).

The structure of the block copolymer is not particularly limited. For example, diblock structure and a triblock structure (ABA type and BAB type) are allowed. In addition, in the comb-like copolymer, the main chain may be constituted of the hydrophilic block or the hydrophobic block or the hydrophilic block and the hydrophobic block.

In addition, the hydrophilic unit may be constituted of, for example, condensation-based block such as hydrophilic block (polyalkylene oxide such as polyethyleneoxide and polyethyleneoxide-polypropylene oxide) constituted of alkyleneoxide (ethylene oxide, etc.).

The hydrophilic block (polyalkylene oxide, etc.) and the hydrophobic block (polyolefin block, etc.) are allowed to be bonded via a coupling group such as ester bond, amide bond, ether bond, urethane bond, etc.

The hydrophilic and hydrophobic blocks may also be bonded together by modifying the hydrophobic block (such as polyolefin) with a modifier, and introducing the hydrophilic block into the hydrophobic block.

Examples of the modifier include, but are not limited to, an unsaturated carboxylic acid or its anhydride (anhydrous) maleic acid etc.), lactam or an aminocarboxylic acid, hydroxylamine, and diamine.

In addition, the comb copolymer (comb copolymer having the main chain constituted of a hydrophobic block) is allowed to be formed through reaction (or bond) between a polymer obtained from a monomer (such as the hydroxylalkyl(meth)acrylate) having a hydrophilic group such as hydroxyl group and carboxyl group and the condensation-based hydrophilic monomer (such as ethylene oxide group).

Moreover, in the copolymerization component, the hydrophobicity and the hydrophilicity can be balanced by using a hydrophilic nonionic monomer.

For example, such a component includes a monomer or oligomer including an alkyleneoxy (in particular ethyleneoxy) unit such as 2-(2-methoxyethoxy)ethyl(meth)acrylate and polyethyleneglycol monomethacrylate (having, for example, a number average molecular weight of from about 200 to about 1,000).

In addition, hydrophilicity and hydrophobicity can be balanced by modification (for example, esterification) of a hydrophilic group (such as carboxyl group).

The amphiphatic polymer may include a functional group. Examples of the functional group include, but are not limited to, acid groups (or acidic such as carboxyl group or acid anhydride group), sulfo group (sulfonic acid group), and hydroxy group. The amphiphatic polymer may contain such a functional group alone or in combination.

Of these functional groups, the amphiphatic polymer preferably has an acid group, in particular, a carboxyl group.

In addition, when the amphiphatic polymer includes an acid group (such as carboxyl group), the acid group (such as carboxyl group) may at least partially or entirely form a salt (salt with amine, metal salt, etc.). In particular, in the present disclosure, it is possible to suitably use an amphiphatic polymer (that is, including an isolated acid group, in particular, carboxyl group) in which an acid group such as carboxyl group (in particular, all carboxyl groups) does not form a salt [(in particular, a salt (salt with an amine or amine salt) with a basic compound].

The acid value of an amphiphatic polymer having an acid group (carboxyl group in particular) is, for example, preferably from 1 to 100 mg KOH/g, more preferably from 3 to 90 mg KOH/g, and furthermore preferably from 5 to 80 mg KOH/g, and particularly preferably from 7 to 70 mg KOH/g.

Note that, in the amphiphatic polymer having an acid group, the amine value is allowed to be 0 mg KOH/g (or almost 0 mg KOH/g).

In the amphiphatic polymer, the site of the functional group mentioned above is not particularly limited. It can be at the main chain or the side chain and both of the main chain and the side chain.

Such functional groups can be, for example, functional groups (for example, hydroxyl group) derived from a hydrophilic monomer or a hydrophilic unit. They can be introduced into a polymer through copolymerization of a copolymerizable monomer (such as maleic anhydride) having a functional group.

These amphiphatic polymer can be used alone or in combination.

Amphiphatic polymers can be polymer pigment dispersants.

Also, it is possible to use suitably synthesized article or products available on the market as the amphiphatic polymer.

Specific examples of the amphiphatic polymer (polymer pigment dispersant) (or dispersant composed of at least amphiphatic dispersant) available on the market include, but are not limited to, Solsperse series (manufactured by AvECIA GROUP) such as Solsperse 13240, Solsperse 13940, Solsperse 32550, Solsperse 31845, Solsperse 24000, Solsperse 26000, Solsperse 27000, Solsperse 28000, and Solsperse 41090; DISPERBYK series (manufactured by Byk) such as DISPERBYK 160, DISPERBYK 161, DISPERBYK 162, DISPERBYK 163, DISPERBYK 164, DISPERBYK 166, DISPERBYK 170, DISPERBYK 180, DISPERBYK 182, DISPERBYK 184, DISPERBYK 190, DISPERBYK 191, DISPERBYK 192, DISPERBYK 193, DISPERBYK 194, DISPERBYK 2001, and DISPERBYK 2050; EFKA-46, EFKA-47, EFKA-48, EFKA-49, EFKA-1501, EFKA-1502, EFKA-4540, EFKA-4550, Polymer 100, Polymer 120, Polymer 150, Polymer 400, Polymer 401, Polymer 402, Polymer 403, Polymer 450, Polymer 451, Polymer 452, and Polymer 453 (available from EFKA Chemical Co., Ltd.); AJISPER series (manufactured by Ajinomoto Fine-Techno Co., Inc.) such as AJISPER PB711, AJISPER PA111, AJISPER PB811, AJISPER PB821, and AJISPER PW911, FLOWLEN series (manufactured by KYOEISHA CHEMICAL Co., LTD.) such as FLOWLEN DOPA-158, FLOWLEN DOPA-22, FLOWLEN DOPA-17, FLOWLEN TG-700, FLOWLEN TG-720W, FLOWLEN -730W, FLOWLEN -740W, and FLOWLEN -745W; and JONCRYL® series (manufactured by Johnson Polymer) of JONCRYL® 678, JONCRYL® 679, and JONCRYL® 62.

Of these, specific examples of the amphiphatic polymer having an acid group include, but are not limited to, DISPERBYK 190 and DISPERBYK 194.

The number average molecular weight of the amphiphatic polymer is preferably from 1,500 to 100,000, more preferably from 2,000 to 80,000, and furthermore preferably from 3,000 to 50,000, and particularly from 7,000 to 20,000.

The volume of the polymer in the white ink can be obtained by the following method, for example.

First, 50 mg of the white ink is placed in a petri dish, and the whole solvent contained in the white ink is volatilized. The residue in the petri dish is regarded as the whole solid content of the white ink, and the mass of the whole solid content of the white ink is measured. Next, the solid content of the white ink is entirely placed in a crucible and heated at 500° C. By heating the solid content of the white ink at 500 degrees C., the polymer in the white ink is carbonized and burnt off. At this point, the residue in the crucible is regarded as the pigment in the white ink, and the mass of the pigment is measured. The difference obtained by subtracting the mass of the pigment in the white ink from the mass of the whole solid content of the white ink is regarded as the mass of the polymer in the white ink so as to calculate the mass of the polymer. Further, the polymer is isolated from the white ink by centrifugation, and the density of the polymer is determined.

Taking the content ratio (by mass) of the polymer into account, the volume of the polymer is determined by dividing the mass of the polymer by the density of the polymer.

The mass of the polymer in the white ink may also be determined by measuring the content ratio (by mass) of the solid content of the white ink using TG-DSC, and multiplying the mass of the whole solid content of the white ink by the content ratio (by mass) as measured.

The volume ratio of the polymer in the recorded matter can be obtained, for example, by the following method.

First, a cross section of a white image of recorded matter is photographed using a transmission electron microscope (TEM). Next, a cross-section image of the white image is analyzed, and the area ratio of the pigment, the polymer, the void, etc. in the cross section of the white image is measured. From the area ratio obtained by measurement, the volume ratio of the polymer is obtained.

Resin

The type of the resin contained in the ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, acrylic silicone-based resins, cellulose derivatives, polyvinyl alcohols, polyalkylene glycols, natural polymers, polyethylene sulfonate salts, and formalin condensates of naphthalenesulfonic acids.

Resin particles formed of these resins may be also used. It is possible to mix a resin emulsion in which such resin particles are dispersed in water as a dispersion medium with materials such as a coloring material and an organic solvent to obtain an ink. It is possible to use suitably-synthesized resin particles. Alternatively, the resin particle is available on the market. These resin particles can be used alone or in combination.

Examples of the styrene-based resin include, but are not limited to, a styrene-(meth)acrylic acid copolymer and a styrene-maleic anhydride copolymer.

Examples of the acrylic resin include, but are not limited to, a methyl(meth)acrylate-(meth)acrylic acid copolymer.

Examples of the cellulose derivative include, but are not limited to, cellulose ethers including: alkyl cellulose such as nitrocellulose and ethyl cellulose; alkyl-hydroxyalkyl cellulose such as ethyl hydroxyethyl cellulose; hydroxyalkyl cellulose such as hydroxyethyl cellulose and hydroxypropyl cellulose; and carboxyalkyl cellulose such as carboxymethyl cellulose.

Examples of the polyalkylene glycol include, but are not limited to, gelatin and dextrin.

Examples of the polyalkylene glycol include, but are not limited to, liquid polyethylene glycol and polypropylene glycol.

The urethane resin has no particular limit and can be any urethane resin obtained by reaction between, for example, a polyol and a polyisocyanate.

The usable polyols are, for example, polyether polyols, polycarbonate polyols, and polyester polyols.

A polycarbonate-based urethane resin using a polycarbonate polyol as the polyol is particularly preferable to obtain an excellent image fastness.

As the polyether polyol, for example, usable is an article obtained by addition polymerization of an alkyleneoxide to an initiator, which is at least one kind of compounds having two or more active hydrogen atoms.

Specific examples of the initiator include, but are not limited to, ethylene glycol, diethylene glycol, triethylene glycol, propylene glycol, trimethylene glycol, 1,3-butane diol, 1,4-butane diol, 1,6-hexane diol, glycerin, trimethylol ethane, and trimethylol propane.

In addition, specific examples of the alkylene oxide include, but are not limited to, ethylene oxide, propylene oxide, butylene oxide, styrene oxide, epichlorohydrine, and tetrahydrofuran.

As the polyether polyol, in terms of obtaining a binder for ink for inkjet recording capable of imparting extremely high level of abrasion resistance, it is suitable to use polyoxytetra methylene glycol or polyoxypropylene glycol.

As the polycarbonate polyol, it is possible to use a product obtained by, for example, reaction between a carboxylic acid ester and a polyol or reaction between phosgene and bisphenol A.

Specific examples of carboxylic acid esters include, but are not limited to, methyl carbonate, dimethyl carbonate, ethyl carbonate, diethyl carbonate, cyclocarbonate, and diphenyl carbonate.

Specific examples of the polyol reactive with the carboxylic acid ester include, but are not limited to, dihydroxy compounds having a relatively low molecular weight such as ethylene glycol, diethylene glycol, triethylene glycol, 1,2-propylene glycol, 1,3-propylene glycol, dipropylene glycol, 1,4-butane diol, 1,3-butane diol, 1,2-butane diol, 2,3-butane diol, 1,5-pentane diol, 1,5-hexane diol, 2,5-hexane diol, 1,5-pentane diol, 1,5-hexane diol, 2,5-hexane diol, 1,6-hexane diol, 1,7-heptane diol, 1,8-octane diol, 1,9-nonane diol, 1,10-decane diol, 1,11-undecane diol, 1,12-dodecane diol, 1,4-cyclohexane diol, 1,4-cyclohexane dimethanol, hydroquinone, resorcin, bisphenol A, bisphenol F, and 4,4'-biphenol, and polyether polyols such as polyethylene glycol, polypropylene glycol, polyoxytetramethylene glycol, and polyester polyols such as polyhexanmethylene adipate, polyhexamethylene succinate, and polycaprolactone.

As the polyester polyol, for example, it is possible to use a product obtained by esterification reaction between a polyol having a low molecular weight and a polycarboxylic acid, a polyester obtained by a ring-opening polymerization reaction of a cyclic ester compound such as ε-caprolactone, or a copolymerized polyester thereof.

Specific examples of the polyol having a low molecular weight include, but are not limited to, ethylene glycol and propylene glycol.

Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof.

Specific examples of polyisocyanate for use in manufacturing the urethane resins include, but are not limited to, aromatic diisocyanates such as phenylene diisocyanate, tolylene diisocyanate, diphenylmethane diisocyanate, and naphthalene diisocyanate, and diisocyanates having an aliphatic or alicyclic structure such as hexamethylene diisocyanate, lysine diisocyanate, cyclohexane diisocyanate, isophorone diisocyanate, dicyclohexylmethane diisocyanate, xylylene diisocyanate, tetramethyl xylylene diisocyanate, and 2,2,4-trimethyl hexamethylene diisocyanate. These can be used alone or in combination.

To obtain an excellent long-term weatherability, it is preferable to use an aliphatic or alicyclic diisocyanate.

Addition of a urethane resin to ink makes it possible to impart glossiness and fixability to an image.

Urethane resin particles are preferably added as a resin emulsion having the particles dispersed in water as a continuous phase at the time of ink manufacturing.

As the polyurethane resin particle, polycarbonate-based polyurethane resin particles are preferable in terms of water resistance, heat resistance, abrasion resistance, weathering resistance, and scratch resistance of images due to high agglomeration power of carbonate groups. In the case of polycarbonate-based polyurethane resin particle, obtained ink is suitable for printed matter for use in severe conditions like outdoor use.

As the polyurethane resin particle, products available on the market can be used.

Specific examples include, but are not limited to, UCOAT UX-485 (polycarbonate-based polyurethane resin particles), UCOAT UWS-145 (polyester-based polyurethane resin particles), PERMARIN UA-368T (polycarbonate-based polyurethane resin particles), and PERMARIN UA-200 (polyether-based polyurethane resin particles) (all manufactured by Sanyo Chemical Industries, Ltd.). These can be used alone or in combination.

It is possible to use suitably synthesized resins or products available on the market as the resin.

Moreover, a dispersant such as a surfactant can be optionally added to the resin. In particular, a so-called self-emulsification type emulsion is preferable to easily obtain ink having excellent applied film's performance.

If a self-emulsification type emulsion is used, it is preferable in terms of water dispersibility that the resin contain an anionic group in the range where the acid value of the resin is from 5 to 100 mg KOH/g. An acid value of from 5 to 100 mg KOH/g is particularly preferable to obtain excellent scratch resistance and chemical resistance.

In addition, the anionic group imparts good water dispersibility when using, for example, carboxyl group and sulfonic acid group. To introduce such an anionic group to a resin, it is suitable to use a monomer having such an anionic group.

The number average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image fastness.

The number average particle diameter can be measured by using, for example, a particle size analyzer (Nanotrac Wave II UT151, manufactured by MicrotracBEL Corp.).

Assuming that the concentration is kept constant, the porosity becomes high as the particle size is increased because of uneven distribution of the resin, thereby increasing concealing property of the white image.

The proportion of the resin in the entire ink is preferably from 1 to 10 percent by mass. A resin content falling within such a range makes it possible to obtain good fixability and ink stability, image smoothness, and image glossiness.

However, in terms of securing concealing property of the white ink, it is desirable that the solid content other than the pigment is contained in such a manner that the proportion of the pigment in the solid content of the image is 50 percent by volume or more. It is more desirable to contain the resin in such a manner that the proportion of the pigment may be from 60 to 75 percent by volume.

Solvent-soluble Resin

The solvent-soluble resin is soluble in a solvent for use in ink or a vehicle, and can enhance fixability of an image and also improve dispersion stability of the pigment contained in the ink.

The content of the solvent-soluble resin in the ink is preferably from 0.5 to 5 percent by mass if the pigment concentration is from 15 to 30 percent by mass.

An aqueous ink, as being relatively safe, tends to be preferred in the market. Accordingly, a water-soluble resin is preferable as a solvent-soluble resin.

The solvent-soluble resin is preferably added to the ink in a proportion in the total amount of the ink is from 0.01 to 5 percent by mass. If the proportion is 0.01 percent by mass or more, scratch resistance of an image can be improved. If the proportion is 5 percent by mass or less, concealing property of the white image can be improved.

Water-soluble Resin

The white ink for use in the present disclosure may contain a water-soluble resin. Specific examples of the water-soluble resin include, but are not limited to, polyvinyl alcohol (PVA), polyvinyl pyrrolidone, polyethylene oxide, polyacrylamide, and carboxymethyl cellulose (CMC).

It is also possible to contain a crosslinkable monomer such as carbodiimide, aziridine, and isocyanate. In that case, it is possible to form a tougher image by cross-linking the resin contained together.

Specific examples of the aqueous cross-linking agent having a hydrophilic segment added to a polycarbodiimide resin include, but are not limited to, Carbodiimides V-10 and V-12 (both manufactured by Nisshinbo Chemical Corp.).

The proportion of the water-soluble resin in the total amount of the ink is preferably from 0.01 to 5 percent by mass. If the proportion is 0.01 percent by mass or more, scratch resistance of an image can be improved. If the proportion is 5 percent by mass or less, concealing property of the white image can be improved.

Solvent-soluble Polymer

The solvent-soluble polymer is soluble in a solvent for use in ink or a vehicle, and can enhance fixability of an image and also improve dispersion stability of the pigment contained in the ink.

An aqueous ink, as being relatively safe, tends to be preferred in the market. Accordingly, a water-soluble polymer is preferable as a solvent-soluble polymer.

The proportion of the solvent-soluble polymer in the total amount of the ink is preferably from 0.01 to 5 percent by mass. If the proportion is 0.01 percent by mass or more, scratch resistance of an image can be improved. If the proportion is 5 percent by mass or less, concealing property of the white image can be improved.

Water-soluble Polymer

As the water-soluble polymer, a water-soluble polymer having an ionic hydrophilic group, such as an alkali metal salt, an ammonium salt, an inorganic acid salt or an organic acid salt of a sulfonic acid group, a carboxylic acid group or an amino group, may be used. Such water-soluble polymers may be used alone or in combination of two or more of them.

Specific examples include, but are not limited to, cellulose derivatives such as a carboxymethyl cellulose salt and viscose; natural polymers such as an alginate, gelatin, albumin, casein, gum arabic, gum tragacanth and lignin sulfonate; starch derivatives such as cationic starch, phosphate starch and a carboxymethyl starch salt; and synthetic polymers such as a polyacrylate salt, a polyvinyl sulfate salt, a poly(4-vinylpyridine) salt, a polyamide, a polyarylamine salt, a naphthalene sulfonate condensate salt, a styrene-acrylate salt copolymer, a styrene-methacrylate salt copolymer, an acrylate ester-acrylate salt copolymer, an acrylate ester-methacrylate salt copolymer, a methacrylate ester-acrylate salt copolymer, a methacrylate ester-methacrylate salt copolymer, a styrene-itaconate salt copolymer, an itaconate ester-itaconate salt copolymer, a vinylnaphthalene-methacrylate salt copolymer, and a vinylnaphthalene-itaconate salt copolymer. In particular, an ammonium salt of a styrene-acrylate copolymer can suitably be used.

The water-soluble polymer preferably has a weight average molecular weight of from 2,000 to 1,000,000.

If the weight average molecular weight is 2,000 or more, the scratch resistance of an image can be improved. If the weight average molecular weight is 1,000,000 or less, it is easy to set ink viscosity within a dischargeable range in an inkjet method.

The proportion of the water-soluble polymer in the total amount of the ink is preferably from 0.01 to 5 percent by mass. If the proportion is 0.01 percent by mass or more, scratch resistance of an image can be improved. If the proportion is 5 percent by mass or less, concealing property of the white image can be improved.

The water-soluble polymer is also available on the market. Specific examples include, but are not limited to, JONCRYL® 61J (molecular weight, 10,000; acid value, 195), JONCRYL® 68 (molecular weight, 10,000; acid value, 195), JONCRYL® 450 (molecular weight, 10,000 to 20,000; acid value, 100), JONCRYL® 55 (molecular weight, 7,500; acid value, 200), JONCRYL® 555 (molecular weight, 5,000; acid value, 200), JONCRYL® 586 (molecular weight, 3,100; acid value, 105), JONCRYL® 680 (molecular weight, 3,900; acid value, 215), JONCRYL® 682 (molecular weight, 1,600, acid value 235) and JONCRYL® 683 (molecular weight, 7,300; acid value, 150), all manufactured by Johnson Polymer Corp.; B-36 (molecular weight, 6,800; acid value, 250); as well as TEGO Dispers 651, TEGO Dispers 656, TEGO Dispers 670, TEGO Dispers 685, TEGO Dispers 688, TEGO Dispers 750W, TEGO Dispers 755W, and TEGO Dispers 757W (manufactured by Evonik). In this context, the molecular weight refers to the weight average molecular weight.

To strike a balance between fixability to an impermeable medium such as a transparent PET film and dispersion stability of a white pigment in the ink, it is desirable to contain a solvent-soluble resin and a solvent-dispersible resin in the ink at the same time. The solvent-dispersible resin is not soluble but dispersible in a solvent for use in ink or a vehicle.

Organic Solvent

There is no specific limitation to the organic solvent for use in the present disclosure. For example, water-soluble organic solvents can be used. Examples include, but are not limited to, polyols, ethers such as polyol alkylethers and polyol arylethers, nitrogen-containing heterocyclic compounds, amides, amines, and sulfur-containing compounds.

Specific examples of the polyol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl1,3-butanediol, trethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of nitrogen-containing heterocyclic compounds include, but are not limited to, 2-pyrolidone, N-methyl-2-pyrolidone, N-hydroxyethyl-2-pyrolidone, 1,3-dimethyl-2-imidazoline, ε-caprolactam, and γ-butylolactone.

Specific examples of the amide include, but are not limited to, formamide, N-methyl formamide, N,N-dimethylformamide, 3-methoxy-N,N-dimethyl propionamide, and 3-buthoxy-N,N-dimethylpropionamide.

Specific examples of the amine include, but are not limited to, monoethanol amine, diethanol amine, and triethyl amine.

Specific examples of the sulfur-containing compounds include, but are not limited to, dimethyl sulphoxide, sulfolane, and thiodiethanol.

Also, for example, propylene carbonate, ethylene carbonate, etc. can be used as the organic solvent.

To serve as a humectant and impart a good drying property, it is preferable to use an organic solvent having a boiling point of 250 degrees C. or lower.

Polyol compounds having eight or more carbon atoms and glycol ether compounds are also suitable as the organic solvent.

Specific examples of the polyol compounds having eight or more carbon atoms include, but are not limited to, 2-ethyl-1,3-hexanediol and 2,2,4-trimethyl-1,3-pentanediol Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of ink, the proportion is preferably from 10 to 60 percent by mass and more preferably from 20 to 60 percent by mass.

An organic solvent having a boiling point of 250 degrees C. or higher may be used for the white ink. Such an organic solvent is used to ensure wettability while containing a highly concentrated solid content. This also impairs drying property, so that it is desirable to use the solvent in a small amount as possible. It is preferably 1 percent by mass or less.

Specific examples of the organic solvent include, but are not limited to, glycerin, diethylene glycol dibutyl ether, triethylene glycol dimethyl ether, tetraethylene glycol dimethyl ether, polyethylene glycol dimethyl ether, and polyethylene glycol monomethyl ether.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

Additive

The ink may furthermore optionally contain additives such as a surfactant, a defoaming agent, a preservative and fungicide, a corrosion inhibitor, and a pH regulator.

Surfactant

Examples of the surfactant include, but are not limited to, silicone-based surfactants, fluorochemical surfactants, amphoteric surfactants, nonionic surfactants, anionic surfactants, etc.

The silicone-based surfactant has no specific limit and can be suitably selected to suit to a particular application. Of these, silicone-based surfactants not decomposed even in high pH environment are preferable. The silicone-based surfactants include, for example, side chain-modified polydimethyl siloxane, both distal end-modified polydimethyl siloxane, one distal end-modified polydimethyl siloxane, and side chain both distal end-modified polydimethyl siloxane. As the modification group, it is particularly preferable to select a polyoxyethylene group or polyoxyethylene polyoxypropylene group because these demonstrate good properties as aqueous surfactants. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, a perfluoroalkyl sulfonic acid and a salt of perfluoroalkyl sulfonic acid. Specific examples of the perfluoroalkyl carboxylic acid compounds include, but are not limited to, a perfluoroalkyl carboxylic acid and a salt of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

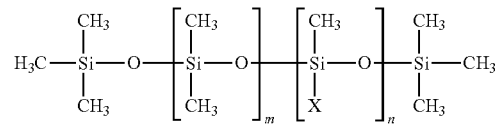

$X=\!\!-\!\!R(C_2H_4O)_s(C_3H_6O)_b R^+$          Chemical formula S-1

In Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

The fluorochemical surfactant is preferably a compound having 2 to 16 fluorine-substituted carbon atoms and more preferably a compound having 4 to 16 fluorine-substituted carbon atoms.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorochemical surfactant represented by the following Chemical formula F-1 or Chemical formula F-2 is more preferable.

Chemical formula F-1

In the compound represented by Chemical formula F-1, m is preferably 0 or an integer of from 1 to 10 and n is preferably 0 or an integer of from 1 to 40.

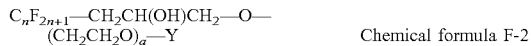

Chemical formula F-2

In the compound represented by Chemical formula F-2, Y represents H or $C_mF_{2m+1}$, where m represents an integer of from 1 to 6, or $CH_2CH(OH)CH_2$—$C_mF_{2m+1}$, where m represents an integer of from 4 to 6, or $C_pH_{2p+1}$, where p is an integer of from 1 to 19. "n" represents an integer of from 1 to 6. "a" represents an integer of from 4 to 14.

As the fluorochemical surfactant, products available on the market may be used. Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation.

Specific examples include, but are not limited to, acid sulfites and sodium thiosulfates. pH Regulator The pH regulator has no particular limit as long as it can control pH to not lower than 7. Specific examples include, but are not limited to, amines such as diethanol amine and triethanol amine.

Glittery Ink Applying Step and Glittery Ink Applying Device

In the glittery ink applying step, a glittery ink is applied onto a recording medium by a glittery ink applying device.

The glittery ink applying device applies a glittery ink onto a recording medium and includes, for example, an inkjet device using an inkjet head, a device using a flexographic printing method, and a device using a bar coater, but is not limited thereto.

Specific examples of other glittery ink printing methods include, but are not limited to, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, a die coating method, and spray coating method.

Glittery Ink

The glittery ink for use in the present disclosure contains a glittery pigment.

The glittery pigment, organic solvent, water, polymer, and additives such as a defoaming agent, a preservatives and fungicides, a pH regulator, and a surfactant for use in the glittery ink are described below.

As the organic solvent, the same organic solvent as those for the white ink for use in the present disclosure can be used.

As the water, the same as those for the white ink for use in the present disclosure can be used.

As the surfactant, the same as those for the white ink for use in the present disclosure can be used.

As the defoaming agent, the same as those for the white ink for use in the present disclosure can be used.

As the preservatives and fungicides, the same as those for the white ink for use in the present disclosure can be used.

As the pH regulator, the same as those for the white ink for use in the present disclosure can be used.

The glittery ink may also contain a precipitation preventing agent, a redispersion promoter, a leveling agent, a filler, etc.

In addition, the glittery ink obtains the same effect as the white ink by the inclusion and the amount of the organic solvent, water, and additives.

Selection of the glittery pigment contained in the glittery ink is not particularly limited. The glittery pigment imparts glossiness to a white image when the glittery ink is applied onto the white image, and is capable of imparting glossiness to the object to which the pigment is attached. Examples of such a glittery pigment include, but are not limited to, a pearl pigment, metal particles, etc. Representative examples of the pearl pigment include, but are not limited to, pigments having pearly luster or interference luster, such as titanium dioxide-coated mica, fish scale foil, and bismuth oxychloride.

Specific examples of the metal particles include, but are not limited to, particles of aluminum, silver, gold, platinum, nickel, chromium, tin, zinc, indium, titanium, copper, etc. Particles made of at least one member selected from the group consisting of such elementary metals, alloys thereof, and mixtures thereof may be used. The glittery pigment for use in this embodiment is practically effective irrespective of the type of pearl pigment or metal particles. However, it is preferable to use a metal pigment, in particular, silver in terms of the level of glossiness.

The metal pigment may take a microspherical form or a tabular form (flake form). The latter is preferable to the former. If the metal pigment takes a tabular form, the metal pigment accumulates on the surface of a glittery image in an overlapping manner. This increases the contact area between the metal pigment particles, thereby enhancing electric conduction, smoothness of an image, and concealing property. As a consequence, an image having excellent metallic luster and image clarity can be obtained.

In the present disclosure, the tabular form (flake form) means that the metal pigment takes a flat shape. For example, when the equivalent circle diameter is determined from the area in XY plane of the tabular particle of the metal pigment, assuming that the particle has the major axis X and the minor axis Y in the plane of the tabular form as well as the thickness Z, the 50 percent particle diameter R50 as the equivalent circle diameter is from 0.1 to 3 μm, and the relation: R50/Z>5 is satisfied.

The major axis X, the minor axis Y, and the equivalent circle diameter of the tabular particle can be measured using a particle image analyzer. Examples of the particle image analyzer include, but are not limited to, flow type particle image analyzers FPIA-2100, FPIA-3000, and FPIA-3000S (all manufactured by Sysmex Corporation).

In the following, the glittery ink is described with reference to silver-containing ink (also referred to as silver ink) as an example of the glittery ink.

Silver

With silver, an image having excellent metallic luster can be formed.

Silver mentioned above includes silver particles in a microspherical form or silver in a tabular form. Usage of tabular silver is preferable.

The concentration of silver contained in the glittery ink is preferably from 2 to 15 percent by mass. With a concentration falling within the range of from 2 to 15 percent by mass, the glossiness of a glittery image and the discharging stability of the ink are made favorable.

The number average particle diameter of the metal pigment is preferably from 100 to 610 nm, more preferably from 200 to 610 nm, and furthermore preferably from 200 to 460 nm, and particularly from 200 to 370 nm. If the number average particle diameter of the metal pigment is from 100 to 610 nm, the glossiness of a glittery image and discharging stability of the ink are made favorable.

In terms of light resistance, the lower limit of the number average particle diameter of the metal pigment is preferably 160 nm or more, more preferably 200 nm or more, and furthermore preferably 260 nm or more, if the number average particle diameter of the metal pigment is 160 nm or more, discoloration due to the aggregation of a metal pigment such as silver upon exposure to light can be prevented.

Silver in Tabular Form

The silver is preferably in a tabular form. If silver in a tabular form (also referred to as tabular silver) is used, the silver accumulates on the surface of a glittery image in an overlapping manner. This increases the contact area between the metal pigment particles, thereby enhancing electric conduction, smoothness of an image, and concealing property. As a consequence, an image having excellent metallic luster and image clarity can be obtained.

The silver in a tabular form may be produced by any method. For example, first, impurities are removed from a solution mixture of an aqueous silver nitrate solution and an aqueous oxalic acid solution to obtain a silver oxalate mixed solution. Further, a carrier (for example, a dispersant such as polyethylene glycol or a hydrophilic liquid including alcohols) is added to the silver oxalate solution mixture. Thereafter, ultrasonic wave is added to obtain a silver oxalate liquid dispersion. While pressurizing with an autoclave at 0.5 MPa, the silver oxalate liquid dispersion is stirred at 150 rpm for 30 minutes as being heated to 150 degrees C., so as to promote decomposition of silver oxalate. As a result, a tabular silver liquid dispersion containing silver taking a tabular form is obtained. Thereafter, the silver taking a tabular form is isolated from the tabular silver liquid dispersion. The surface of the obtained silver taking a tabular form has an arithmetic mean roughness Ra of 10 nm or less.

The median size (D50) of the silver in a tabular form is preferably from 0.1 to 20 μm.

The standard deviation σD of the median size (D50) of the silver taking a tabular form is preferably 10 μm or less.

The silver taking a tabular form preferably has an average thickness Tave of from 1 to 100 nm and an aspect ratio (D50/Tave) of from 20 to 1,000.

The arithmetic mean roughness Ra is measured by an atomic force microscope (AFM). The AFM is a type of scanning probe microscope. The AFM has a cantilever and a probe mounted onto the tip of the cantilever. This probe scans the surface of a microparticle. The cantilever is vertically displaced by the force acting between atoms of the sample and the probe. The displacement of the cantilever is measured.

In the present disclosure, for instance, "SPM-9600" manufactured by Shimadzu Corporation is used as an AFM. The measurement conditions are as follows:

Mode: Contact mode
Cantilever: OMCL-TR 800PSA-1 manufactured by Olympus Corporation
Resolution: 512×512 pixels
Height resolution: 0.01 nm
Lateral resolution: 0.2 nm When the silver taking a tabular form is prepared, a glycolic dispersant is suitably used as the dispersant for use in the silver oxalate liquid dispersion. By including a glycolic dispersant, a tabular silver having a small particle size distribution, a small arithmetic mean roughness Ra, and a large aspect ratio (D50/Tave) is obtained. In addition, a tabular silver produced from a silver oxalate liquid dispersion containing a glycolic dispersant has excellent dispersibility. As a glycolic dispersant, polyethylene glycol is suitably used.

The pressure during the decomposition of silver oxalate is preferably higher than the atmospheric pressure. Due to the reaction under pressure, a tabular silver having a small particle size distribution and an arithmetic mean roughness Ra is obtained. The pressure at the time of pressurization is preferably from 2 to 10 kgf/cm$^2$.

The stirring speed during the decomposition of silver oxalate is preferably 100 rpm or more. Aggregation of the contained particles is reduced at a stirring speed of 100 rpm or more. Consequently, a tabular silver having a small particle size distribution and a large aspect ratio (D50/Tave) is obtained. The stirring speed is preferably from 100 to 1,000 rpm, and more preferably from 130 to 1,000 rpm.

The temperature of the silver oxalate liquid dispersion during the decomposition of silver oxalate is preferably 100 degrees C. or higher, more preferably from 100 to 150 degrees C., and furthermore preferably from 120 to 150 degrees C. in terms of reducing the reaction time.

Examples of a solvent usable for the silver oxalate dispersion liquid include, but are not limited to, alcohols such as aliphatic alcohols, alicyclic alcohols, araliphatic alcohols and polyhydric alcohols; glycol ethers such as (poly)alkylene glycol monoalkyl ether and (poly)alkylene glycol monoaryl ether; glycol esters such as (poly)alkylene glycol acetate; glycol ether esters such as (poly)alkylene glycol monoalkyl ether acetate; hydrocarbons such as aliphatic hydrocarbons and aromatic hydrocarbons; esters; ethers such as tetrahydrofuran and diethyl ether; and amides such as dimethylformamide (DMF), dimethylacetamide (DMAC) and N-methyl-2-pyrrolidone (NMP). Such solvents may be used alone or in combination.

Silver Colloid Liquid

Silver is preferably dispersed in an aqueous dispersion medium as silver colloid having protective colloid attached to the surface thereof. Due to this, dispersion property of silver to an aqueous dispersion medium is particularly excellent, thereby significantly improving storage stability of silver ink. The silver colloid can be prepared by any method. For example, it can be obtained by preparing a solution containing silver ion and reducing this silver ion with a reducing agent under the presence of a protection colloid. For manufacturing a metal colloid by these methods, addition of a surfactant to an aqueous solution at any moment before and after reduction reaction further improves dispersion stability of silver particles. The number average particle diameter of silver can be controlled by controlling the reduction reaction. That is, it is possible to control the addition speed of the reducing agent and the reaction temperature. For example, particles having smaller particle diameters can be obtained by slowing down the addition speed of the reducing agent and lowering the liquid temperature.

The protective colloid can be any organic article serving to protect the surface of the silver particle. For example, organic compounds having a carboxyl group or dispersant polymers are preferable. These can be used alone or in combination, and the combinational use is more preferable to demonstrate synergy effect.

Organic Compound Having Carboxyl Group

The number of carboxyl groups is not particularly limited as long as the number is at least one per molecule. As an example, the number is preferably from 1 to 10, more preferably from 1 to 5, and furthermore preferably from 1 to 3. In the organic compound having a carboxyl group, carboxyl group may form a salt (for example, salts with amine, metal salts, etc.). In particular, in the present disclosure, it is possible to suitably use an organic compound in which carboxyl groups (in particular, all carboxyl groups) do not form a salt with a basic compounds (such as a salt with amine or an amine salt), i.e., an organic compound having an isolated carboxyl group.

In addition, as the organic compound having a carboxyl group, it has no particular limit as long as it includes carboxyl group, and can be suitably selected to suit to a particular application. Also, inclusion of functional groups (or coordinating group to metal compound or metal nano particle) other than carboxyl group is allowed.

Examples of the functional group other than carboxyl group (or a coordinating group) include, but are not limited to, a group (or functional group) containing at least one hetero atom selected from the group consisting of a halogen atom, a nitrogen atom, an oxygen atom and a sulfur atom or a group forming such a salt (e.g., an ammonium salt group). The organic compound having a carboxy group may have a functional group alone or in combination.

Specific examples of the halogen atom include, but are not limited to, a fluorine atom, a chlorine atom, a bromine atom, and an iodine atom.

Specific examples of the group containing a nitrogen atom include, but are not limited to, an amino group, a substituted amino group (e.g., a dialkylamino group), an imino group (—NH—), a nitrogen ring group (a 5- to 8-membered nitrogen ring group such as a pyridyl group, a carbazole group, a morpholinyl group, etc.), an amido group (—CON>), a cyano group, and a nitro group.

Specific examples of the group containing an oxygen atom include, but are not limited to, a hydroxyl group, an alkoxy group (for example, an alkoxy group with 1 to 6 carbon atoms such as a methoxy group, an ethoxy group, a propoxy group, and a butoxy group), a formyl group, a carbonyl group (—CO—), an ester group (—COO—), and an oxygen ring group (a 5- to 8-membered oxygen ring group such as a tetrahydropyranyl group, etc.).

Specific examples of the group containing a sulfur atom include, but are not limited to, a thio group, a thiol group, a thiocarbonyl group (—SO—), an alkylthio group (an alkylthio group with 1 to 4 carbon atoms such as a methylthio group and an ethylthio group, etc.), a sulfo group, a sulfamoyl group, and a sulfinyl group (—SO$_2$—).

As the organic compound containing carboxylic group, of these functional groups, compounds containing no basic group (in particular, amino group, substituted amino group, imino group, ammomium salt group, etc.) that can form a salt with carboxyl group are preferable.

Organic compounds containing representative carbocylic groups include carboxylic acids. Examples include, but are not limited to, monocarboxylic acids, polycarboxylic acids, and hydroxy carboxylic acids (or oxycarboxylic acids).

Examples of the monocarboxylic acid include, but are not limited to, a saturated aliphatic monocarboxylic acid, an unsaturated aliphatic monocarboxylic acid, and an aromatic monocarboxylic acid.

Examples of the saturated aliphatic monocarboxylic acid include, but are not limited to, aliphatic monocarboxylic acids with 1 to 34 carbon atoms (preferably aliphatic monocarboxylic acids with 1 to 30 carbon atoms), such as acetic acid, propionic acid, butyric acid, caprylic acid, caproic acid, hexanoic acid, capric acid, lauric acid, myristic acid, cyclohexanecarboxylic acid, dehydrocholic acid, and cholanoic acid.

Examples of the unsaturated aliphatic monocarboxylic acid include, but are not limited to, unsaturated aliphatic monocarboxylic acids with 4 to 34 carbon atoms (preferably unsaturated aliphatic monocarboxylic acids with 10 or less carbon atoms and unsaturated aliphatic monocarboxylic acids with 30 or more carbon atoms), such as oleic acid, erucic acid, linoleic acid, and abietic acid.

Examples of the aromatic monocarboxylic acid include, but are not limited to, aromatic monocarboxylic acids with 7 to 12 carbon atoms, such as benzoic acid and naphthoic acid.

Examples of the polycarboxylic acid include, but are not limited to, an aliphatic saturated polycarboxylic acid, an aliphatic unsaturated polycarboxylic acid, and an aromatic polycarboxylic acid.

Examples of the aliphatic saturated polycarboxylic acid include, but are not limited to, aliphatic saturated polycarboxylic acids with 2 to 14 carbon atoms (preferably an aliphatic saturated polycarboxylic acid with 2 to 10 carbon atoms, etc.), such as oxalic acid, malonic acid, succinic acid, glutaric acid, adipic acid, azelaic acid, sebacic acid, and cyclohexanedicarboxylic acid.

Examples of the aliphatic unsaturated polycarboxylic acid include, but are not limited to, aliphatic unsaturated polycarboxylic acids with 4 to 14 carbon atoms (preferably an aliphatic unsaturated polycarboxylic acid with 4 to 10 carbon atoms, etc.), such as maleic acid, fumaric acid, itaconic acid, sorbic acid, and tetrahydrophthalic acid.

Specific examples of the aromatic polycarboxylic acid include, but are not limited to, aromatic polycarboxylic acids with 8 to 12 carbon atoms, such as phthalic acid and trimellitic acid.

Examples of the hydroxycarboxylic acid include, but are not limited to, a hydroxymonocarboxylic acid and a hydroxypolycarboxylic acid.

Examples of the hydroxymonocarboxylic acid include, but are not limited to, an aliphatic hydroxymonocarboxylic acid and an aromatic hydroxymonocarboxylic acid.

Examples of the aliphatic hydroxymonocarboxylic acid include, but are not limited to, glycolic acid, lactic acid, oxybutyric acid, glyceric acid, 6-hydroxyhexanoic acid, cholic acid, deoxycholic acid, chenodeoxycholic acid, 12-oxochenodeoxycholic acid, glycocholic acid, lithocol An aliphatic hydroxymonocarboxylic acid having 2 to 50 carbon atoms (preferably an aliphatic hydroxymonocarboxylic acid having 2 to 34 carbon atoms, more preferably an aliphatic hydroxycarboxylic acid having 2 to 34 carbon atoms, such as an acid, hyodeoxycholic acid, ursodeoxycholic acid, apocholic acid, taurocholic acid, preferably an aliphatic hydroxy monocarboxylic acid having 2 to 30 carbon atoms), etc..

Examples of the aromatic hydroxymonocarboxylic acid include, but are not limited to, aromatic hydroxymonocarboxylic acids with 7 to 12 carbon atoms, such as salicylic acid, oxybenzoic acid and gallic acid.

An example of the hydroxypolycarboxylic acid is an aliphatic hydroxypolycarboxylic acid.

Examples of the aliphatic hydroxypolycarboxylic acids include, but are not limited to, aliphatic hydroxypolycarboxylic acids with 2 to 10 carbon atoms, such as tartronic acid, tartaric acid, citric acid, and malic acid.

Those carboxylic acids are allowed to form salts and may be anhydrides or hydrates. In many cases, as described above, carboxylic acid does not form a salt (in particular, salts with basic compounds such as salts with amines).

These organic compounds having carboxylic acid can be used alone or in combination.

As the organic compound having carboxyl group, hydroxy carboxylic acids are preferable such as aliphatic hydroxy carboxylic acids (aliphatic hydroxymonocarboxylic acids and aliphatic hydroxypolycarboxylic acids).

As the aliphatic hydroxy carboxyl group, alicyclic hydroxy carboxylic acids or hydroxycarboxylic acid having an alicyclic backbone are preferable.

As the alicyclic hydroxy carboxylic acid or hydroxycarboxylic acid having an alicyclic backbone, alicyclic hydroxy carboxylic acids having 6 to 34 carbon atoms such as cholic acid are preferable. Alicyclic hydroxy carboxylic acids having 10 to 34 carbon atoms are preferable, and alicyclic hydroxy carboxylic acids having 16 to 30 carbon atoms are particularly preferable.

In addition, a polycyclic aliphatic carboxylic acid such as cholic acid, a polycyclic aliphatic carboxylic acid such as dehydrocholic acid and colanic acid, etc., which have a bulky structure, are preferable because they are significantly effective at suppressing the aggregation of silver particles.

Examples of the polycyclic aliphatic carboxylic acid include, but are not limited to, a condensed polycyclic aliphatic hydroxycarboxylic acid, preferably a condensed polycyclic aliphatic hydroxycarboxylic acid with 10 to 34 carbon atoms, and more preferably a condensed polycyclic aliphatic hydroxycarboxylic acid with 14 to 34 carbon atoms, especially a condensed polycyclic aliphatic hydroxycarboxylic acid with 18 to 30 carbon atoms.

Other examples of the polycyclic aliphatic carboxylic acid include, but are not limited to, a condensed polycyclic aliphatic carboxylic acid, preferably a condensed polycyclic aliphatic carboxylic acid with 10 to 34 carbon atoms, and more preferably a condensed polycyclic aliphatic carboxylic acid with 14 to 34 carbon atoms, especially a condensed polycyclic aliphatic carboxylic acid with 18 to 30 carbon atoms.

The number average molecular weight of the organic compound having a carboxyl group is preferably 1,000 or less, more preferably 800 or less, and furthermore preferably 600 or less. The pKa value of the organic compound having a carboxyl group is preferably 1 or more, more preferably 2 or more, and even more preferably from 2 to 8. The number average molecular weight can be measured by gel permeation chromatography (GPC).

For the silver colloid, the organic compound having a carboxyl group is preferably combined with a polymer to form a protective colloid. A protective colloid having such a combination assists in obtaining a silver colloid containing silver particles having an extremely small ratio of coarse particles. Due to this particular combination of the protective colloid, the proportion of the silver particle can be increased in spite of a small proportion of coarse particles and storage stability of the silver colloid (and liquid dispersion thereof) is excellent.

The polymer is not particularly limited as long as the polymer is capable of coating silver particles, and the polymer may be the same as that used in the white ink for use in the present disclosure. An amphiphatic polymer (or oligomer) can be suitably used.

If resin particles are used as the polymer in the glittery ink, the number average particle diameter of the resin particles is preferably from 10 to 100 nm, and more preferably from 10 to 30 nm. When the number average particle diameter is from 10 to 100 nm, it is possible to strike a balance between metallic luster (glossiness) and scratch resistance of coating film.

The number average particle diameter can be measured by using, for example, a particle size analyzer (Nanotrac Wave II UT151, manufactured by MicrotracBEL Corp.).

The resin particles are capable of improving dispersibility of the glittery pigment in the glittery ink and hardness and scratch resistance of a glittery image. The proportion of the resin particle in the glittery ink is preferably not more than 5 percent by mass and more preferably not more than 2 percent by mass. If the proportion is not more than 5 percent by mass, the storage stability, discharging stability, and glossiness of the glittery ink can be enhanced.

Color Ink Applying Step and Color Ink Applying Device

In the present disclosure, in addition to the white ink applying step and the glittery ink applying step, a color ink applying step may further be included.

In the present disclosure, in addition to the white ink applying device and the glittery ink applying device, a color ink applying device may further be included.

As the color ink applying device, those devices similar to the white ink applying device and the glittery ink applying device can be used.

The color ink contains a coloring material other than the metal oxide and the glittery pigment. As the coloring material, those which are commonly used, such as pigments and dyes, can suitably be used. The same water, organic solvent, additives, etc. as those for use in the white ink for use in the present disclosure can be used.

Method of Manufacturing Ink

The ink can be manufactured by, for example, stirring and mixing the coloring material, water, the organic solvent, the surfactant, the polymer, and other optional components. The ingredients mentioned above are mixed and stirred by, for example, a sand mill, a homogenizer, a ball mill, a paint shaker, an ultrasonic dispersing device, a stirrer having a typical stirring wing, a magnetic stirrer, and a high speed dispersing device.

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:
Standard cone rotor (1°34'×R24)
Sample liquid amount: 1.2 mL
Rotational frequency: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal material in contact with liquid.

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid fabrication object or solid freeform fabrication object) as a material for 3D modeling.

Any known device can be used as the solid freeform fabrication apparatus to fabricate a solid fabrication object with no particular limit. For example, the apparatus is formed of a container, a supplying device, and a discharging device, a drier, etc. of ink. The solid fabrication object includes an object manufactured by repeated ink coating. In addition, the solid fabrication object includes a molded processed product manufactured by processing a structure having a substrate such as a recording medium to which the ink is applied. The molded processed product is manufactured from recorded matter or a structure having a sheet-like form, film-like form, etc. by, for example, heating drawing or punching. The molded processed product is suitably used for articles which are molded after surface-decorating. Examples are gauges or operation panels of vehicles, office machines, electric and electronic devices, cameras, etc.

Drying Process

The present disclosure may include a drying step. The drying step is suitably conducted by a drying device. The drying step is suitably conducted after the white ink applying step, the glittery ink applying step, and the color ink applying step. Actually, the drying step can be freely set and conducted after each of the white ink applying step, the glittery ink applying step and the color ink applying step, or after only one of such applying steps.

It is particularly preferable to include the drying step after the white ink applying step and before the glittery ink applying step. Due to the drying step after the white ink applying step and before the glittery ink applying step, volatile components in the white ink are volatilized, and voids suitably appear in the white image. As a result, the metallic luster and image clarity of a glittery image formed on the white image are further enhanced.

For drying, air blowing, hot air blowing, heating, or natural drying at normal temperature, etc. may freely be selected and used.

The natural drying at normal temperature may be conducted by the white ink applying step and the glittery ink applying step in different passes. If the white ink applying step and the glittery ink applying step are conducted in different paths, there is a time interval between the white image forming and the glittery ink application onto the formed white image. Accordingly, the applied white ink can be dried in the time interval. No such devices as a heater and a blower need to be used to dry a white image, which is preferable.

In a case where the white ink applying step and the glittery ink applying step are conducted by an inkjet method, and printing is conducted in different paths, a time lag between the application of the white ink and the application of the glittery ink may be set to dry the white image.

In addition, for non-permeable recording media as the recording media, it is preferable to heat it after recording in order to obtain better quality images with good friction resistance and attachability to the recording medium under a high performance recording condition. This heating after image forming accelerates film forming of resin particles contained in ink so that image hardness of recorded matter can be enhanced.

The heating temperatures is preferably high in terms of drying property and film-forming temperatures. Specifically, it is more preferably from 40 to 100 degrees C. and particularly preferably from 50 to 90 degrees C. When the heating temperature is in the range of from 40 to 100 degrees C., damage to a non-permeating recording medium due to heat can be prevented and non-discharging ascribable to a heated ink head can be reduced.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less within 30 msec$^{1/2}$ of the contact of the ink according to Bristow method.

For example, plastic films such as vinyl chloride resin film, polyethylene terephthalate (PET) film, polypropylene film, polyethylene film, and polycarbonate film are suitably used as the non-permeable substrate.

The recording media are not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

According to the present disclosure, a glittery image having excellent metallic luster and image clarity can be formed on any recording medium.

A particular advantage is that a glittery image having excellent metallic luster and image clarity can be also formed on an impermeable substrate incapable of absorbing a liquid component or polymer.

Recorded Matter

Recorded matter of the present disclosure comprises a white image including a metal oxide, which is formed on an impermeable recording medium and a glittery image including a glittery pigment, which is formed on the white image, wherein the glittery image has a 20° glossiness of 200 or more and an image clarity value of 5 or more.

In the recorded matter of the present disclosure, voids appear in the white image by using the white ink of the present disclosure, and the voids absorb the polymer contained in the glittery ink. Consequently, recorded matter having excellent metallic luster and image clarity can be obtained.

When a glittery image is formed on an impermeable substrate using a glittery ink containing a polymer, the polymer in the glittery ink is not absorbed by the substrate. Therefore, a glittery image striking a balance between glossiness and image clarity is not formed. However, using the white ink and the glittery ink for use in the present disclosure, a glittery image striking a balance between glossiness and image clarity can be formed on an impermeable substrate.

The 20° glossiness can be measured by a gloss meter (Micro-TRI-gloss manufactured by BYK Gardner Corp.). The 20° glossiness is 200 or more and preferably 500 or more.

With respect to the image clarity, a Suga tester ICM-1 model can be used to measure the image clarity at an optical comb width of 2.0 mm according to the image clarity measuring method defined in JIS-H 8686 format. The image clarity is 5 or more and preferably 30 or more.

Recording Device and Recording Method

Hereinafter, an example in which black (K), cyan (C), magenta (M), and yellow (Y) are used is described. It is suitable to use the white ink or the glittery ink in place of or in addition to those.

The ink for use in the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing liquids, etc. to a recording medium and a method of recording utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc. in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll-like form as a recording medium.

Figure 2:
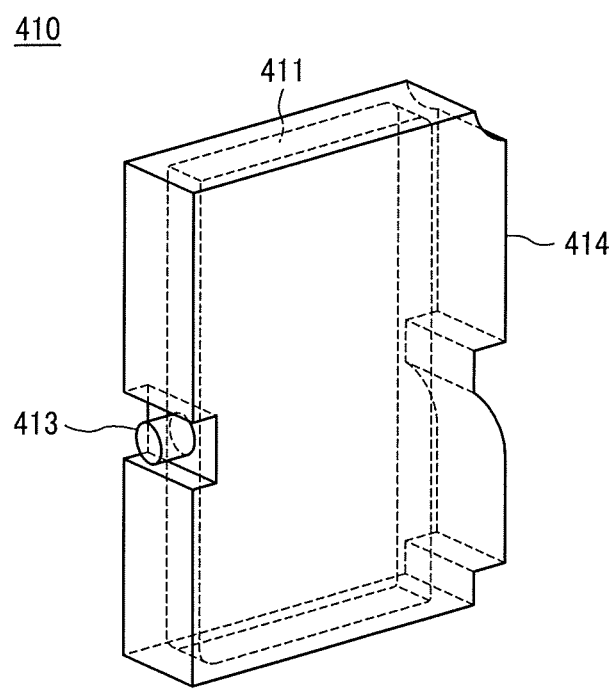
FIG. 2 is a diagram illustrating a perspective view of an example of the main tank of the device illustrated in FIG. 1.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit 411 of each main tank 410 (410$k$, 410$c$, 410$m$, and 410$y$) for each color of black (K), cyan (C), magenta (M), and yellow (Y) is made of, for example, a packaging member such as aluminum laminate film.

The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401$c$ is opened. The main tank 410 is detachably attached to the cartridge holder 404. This enables each ink outlet 413 of the main tank 410 to communicate with a discharging head 434 for each color via a supplying tube 436 for each color so as to discharge the ink from a discharging head 434 to a recording medium.

The image forming method of the present disclosure is not particularly limited, and is exemplified by the following four methods.

Exemplary method 1: A white ink is applied to a recording medium using an inkjet head so as to form a white image. Thereafter, a glittery ink is applied onto the white image also using an inkjet head so as to form a glittery image.

Exemplary method 2: A white ink is applied to a recording medium utilizing a method not using an inkjet head so as to form a white image. Thereafter, a glittery ink is applied onto the white image using an inkjet head so as to form a glittery image.

Exemplary method 3: A white ink is applied to a recording medium using an inkjet head so as to form a white image. Thereafter, a glittery ink is applied onto the white image utilizing a method not using an inkjet head so as to form a glittery image.

Exemplary method 4: A white ink is applied to a recording medium utilizing a method not using an inkjet head so as to form a white image. Thereafter, a glittery ink is applied onto the white image utilizing a method not using an inkjet head so as to form a glittery image. Exemplary method 1 is preferable and advantageous. The advantages are that alignment in superposing the white ink and the glittery ink is easy and accurate, and no plates are required for printing.

In the case of Exemplary method 1, the white image and the glittery ink image can be formed in the same pass or the glittery ink can be applied in a different pass.

Application of the glittery ink in a different pass is preferable because it is preferable to form voids in the white image.

The white ink may be applied to at least the region where a glittery image is to be formed. Therefore, the whit ink can be partially or entirely applied to the surface of the recording medium.

In another embodiment, a method may be employed in which a transparent coating film is formed on the surface of a recording medium using a processing fluid, and thereafter the white ink is applied to the recording medium. As a method or device for applying a processing fluid, the same device as that for applying the white ink or the glittery ink may be used.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto.

Preparation of White Pigment Dispersion 1

An amount equivalent to 40 g of titanium oxide of A-190 (metal oxide, manufactured by Sakai Chemical Industry Co., Ltd.), 8 g of a pigment dispersant (polymer, TEGO Dispers 651, manufactured by Evonik Corp.), and water as the balance were mixed to make the total amount to be 100 g, and the mixture was dispersed for 5 minutes in a bead mill (Research Lab, manufactured by Shinmaru Enterprises Corp.) equipped with zirconia beads having a diameter of 0.3 mm with a filling ratio of 60 percent and at 8 m/s to obtain White pigment dispersion 1 having a number average particle diameter of 150 nm.

Preparation of White Pigment Dispersion 2

White pigment dispersion 2 having a number average particle diameter of 200 nm was obtained in the same manner as in Preparation of White Pigment Dispersion 1 except that the metal oxide was changed to R-21 (manufactured by Sakai Chemical Industry Co., Ltd.) equivalent to 40 g of titanium oxide.

Preparation of White Pigment Dispersion 3

White pigment dispersion 3 having a number average particle diameter of 250 nm was obtained in the same manner as in Preparation of White Pigment Dispersion 1 except that the metal oxide was changed to JR-600A (manufactured by TAYCA CORPORATION) equivalent to 40 g of titanium oxide.

Preparation of White Pigment Dispersion 4

White pigment dispersion 4 having a number average particle diameter of 290 nm was obtained in the same manner as in Preparation of White Pigment Dispersion 1 except that the metal oxide was changed to JR-301 (manufactured by TAYCA CORPORATION) equivalent to 40 g of titanium oxide.

Preparation of White Pigment Dispersion 5

White pigment dispersion 5 having a number average particle diameter of 340 nm was obtained in the same manner as in Preparation of White Pigment Dispersion 1 except that the metal oxide was changed to JR-800 (manufactured by TAYCA CORPORATION) equivalent to 40 g of titanium oxide.

Preparation of White Pigment Dispersion 6

White pigment dispersion 6 having a number average particle diameter of 400 nm was obtained in the same manner as in Preparation of White Pigment Dispersion 1 except that the metal oxide was changed to R-380 (manufactured by Titan Kogyo, Ltd.) equivalent to 40 g of titanium oxide.

Preparation of White Pigment Dispersion 7

White pigment dispersion 7 having a number average particle diameter of 420 nm was obtained in the same manner as in Preparation of White Pigment Dispersion 1 except that the metal oxide was changed to KR-380N (manufactured by Titan Kogyo, Ltd.) equivalent to 40 g of titanium oxide.

Preparation Example 8 of White Pigment Dispersion

White pigment dispersion 8 having a number average particle diameter of 500 nm was obtained in the same manner as in Preparation of White Pigment Dispersion 1 except that the metal oxide was changed to ST-730EC (manufactured by Titan Kogyo, Ltd.) equivalent to 25 g of titanium oxide.

Preparation of White Pigment Dispersion 9

White pigment dispersion 9 having a number average particle diameter of 800 nm was obtained in the same manner as in Preparation of White Pigment Dispersion 1 except that the metal oxide was changed to JR-1000 (manufactured by TAYCA CORPORATION) equivalent to 40 g of titanium oxide and the mixture was dispersed for 180 minutes.

Preparation of White Pigment Dispersion 10

White pigment dispersion 10 having a number average particle diameter of 1000 nm was obtained in the same manner as in Preparation of White Pigment Dispersion 1 except that the metal oxide was changed to JR-1000 (manufactured by TAYCA CORPORATION) equivalent to 40 g of titanium oxide.

Preparation of White Pigment Dispersion 11

White pigment dispersion 11 having a number average particle diameter of 290 nm was obtained in the same manner as in Preparation of White Pigment Dispersion 1 except that the metal oxide was changed to B-35 (barium sulfate, manufactured by Sakai Chemical Industry Co., Ltd.) equivalent to 40 g of barium sulfate.

Preparation Example of White Ink

Preparation of White Ink 1

Materials of the following formulation were mixed and stirred in such a manner that the total amount was 100 parts. Thereafter, the mixture was filtered through a polypropylene filter having an average pore size of 0.2 μm (Syringe filter; manufactured by Sartorius Corp.) to obtain White ink 1.

Formulation of White Ink 1

White pigment dispersion 1: 24.0 parts (solid content)

1,2-propane diol (manufactured by Tokyo Chemical Industry Co. Ltd.): 24.8 parts

3-Methoxy-3-methylbutanol (manufactured by Tokyo Chemical Industry Co., Ltd.): 3.5 parts 2-Ethyl-1,3-hexanediol (manufactured by Tokyo Chemical Industry Co., Ltd.): 3.0 parts 2-amino-2-ethyl-1,3-propane diol (manufactured by Tokyo Chemical Industry Co., Ltd.): 0.2 parts BYK-345 (manufactured by BYK Japan KK): 1.0 part SUPERFLEX® 420 NS (urethane resin, manufactured by DKS Co. Ltd.): 1.5 parts (solid content)

TEGO Dispers 651 (dispersant, manufactured by Evonik Industries AG): 2.0 parts

Deionized water: Balance

Preparation Examples 2 to 17 of White Ink

Preparation of White Inks 2 to 17

Inks 2 to 17 were obtained in the same manner as in Preparation of White Ink 1 except that the formulation was changed to those shown in Tables 1 and 2.

TABLE 1

| White ink (component: parts by mass) | 1 | 2 | 3 | 4 | 5 | 6 | 7 | 8 | 9 | 10 |
|---|---|---|---|---|---|---|---|---|---|---|
| 1,2-Propanediol | 24.8 | 24 | 23.3 | 22.7 | 22 | 21 | 20.7 | 19.5 | 18 | 12 |
| 3-Methoxy-3-methylbutanol | 3.5 | 3.5 | 3.5 | 3.5 | 3.5 | 3.5 | 3.5 | 3.5 | 3.5 | 3.5 |
| 2-Ethyl-1,3-hexanediol | 3.0 | 3.0 | 3.0 | 3.0 | 3.0 | 3.0 | 3.0 | 3.0 | 3.0 | 3.0 |
| BYK-345 | 1.0 | 1.0 | 1.0 | 1.0 | 1.0 | 1.0 | 1.0 | 1.0 | 1.0 | 1.0 |
| SUPERFLEX 420NS: solid content (manufactured by DKS, urethane emulsion) | 1.5 | 1.5 | 1.5 | 1.5 | 1.5 | 1.5 | 1.5 | 1.5 | 1.5 | 1.5 |
| White dispersion 1: pigment solid content (volume average particle size, 150 nm) | 20.0 | | | | | | | | | |
| White dispersion 2: pigment solid content (volume average particle size, 200 nm) | | 20.0 | | | | | | | | |
| White dispersion 3: pigment solid content (volume average particle size, 250 nm) | | | 20.0 | | | | | | | |
| White dispersion 4: pigment solid content (volume average particle size, 290 nm) | | | | 20.0 | | | | | | |
| White dispersion 5: pigment solid content (volume average particle size, 340 nm) | | | | | 20.0 | | | | | |
| White dispersion 6: pigment solid content (volume average particle size, 400 nm) | | | | | | 20.0 | | | | |
| White dispersion 7: pigment solid content (volume average particle size, 420 nm) | | | | | | | 20.0 | | | |
| White dispersion 8: pigment solid content (volume average particle size, 500 nm) | | | | | | | | 20.0 | | |
| White dispersion 9: pigment solid content (volume average particle size, 800 nm) | | | | | | | | | 20.0 | |
| White dispersion 10: pigment solid content (volume average particle size, 1000 nm) | | | | | | | | | | 20.0 |
| TEGO Dispers 651 (manufactured by Evonik: nonvolatile content, 30%) | 2.0 | 2.0 | 2.0 | 2.0 | 2.0 | 2.0 | 2.0 | 2.0 | 2.0 | 2.0 |
| 2-Amino-2-ethyl-1,3-propanediol | 0.2 | 0.2 | 0.2 | 0.2 | 0.2 | 0.2 | 0.2 | 0.2 | 0.2 | 0.2 |
| Water | Balance | Balance | Balance | Balance | Balance | Balance | Balance | Balance | Balance | Balance |
| Sum (parts by mass) | 100 | 100 | 100 | 100 | 100 | 100 | 100 | 100 | 100 | 100 |
| Volume of pigment (cm$^3$/100 g) | 4.7 | 4.7 | 4.7 | 4.7 | 4.7 | 4.7 | 4.7 | 4.7 | 4.7 | 4.7 |
| Volume of urethane emulsion (cm$^3$/100 g) | 1.2 | 1.2 | 1.2 | 1.2 | 1.2 | 1.2 | 1.2 | 1.2 | 1.2 | 1.2 |
| Volume of dispersant (cm$^3$/100 g) | 0.5 | 0.5 | 0.5 | 0.5 | 0.5 | 0.5 | 0.5 | 0.5 | 0.5 | 0.5 |
| Vp/(Vp + Ve) | 0.74 | 0.74 | 0.74 | 0.74 | 0.74 | 0.74 | 0.74 | 0.74 | 0.74 | 0.74 |

TABLE 2

| White ink (component: parts by mass) | 11 | 12 | 13 | 14 | 15 | 16 | 17 |
|---|---|---|---|---|---|---|---|
| 1,2-Propanediol | 32 | 29.6 | 27.9 | 25.1 | 19.7 | 16.6 | 13.6 |
| 3-Methoxy-3-methylbutanol | 3.5 | 3.5 | 3.5 | 3.5 | 3.5 | 3.5 | 3.5 |
| 2-Ethyl-1,3-hexanediol | 3.0 | 3.0 | 3.0 | 3.0 | 3.0 | 3.0 | 3.0 |
| BYK-345 | 1.0 | 1.0 | 1.0 | 1.0 | 1.0 | 1.0 | 1.0 |
| SUPERFLEX 420NS: solid content (manufactured by DKS, urethane emulsion) | 0.3 | 0.5 | 1.0 | 2.3 | 2.7 | 1.5 | 3.0 |
| White dispersion 4: pigment solid content (volume average particle size, 290 nm) | 20.0 | 20.0 | 20.0 | 20.0 | 20.0 | | 20.0 |
| White dispersion 11: pigment solid content (volume average particle size, 290 nm) | | | | | | 20.0 | |

TABLE 2-continued

| White ink (component: parts by mass) | 11 | 12 | 13 | 14 | 15 | 16 | 17 |
|---|---|---|---|---|---|---|---|
| TEGO Dispers 651 (manufactured by Evonik; nonvolatile content, 30%) | 0.4 | 0.6 | 1.3 | 3.0 | 4.0 | 2.0 | 4.0 |
| 2-Amino-2-ethyl-1,3-propanediol | 0.2 | 0.2 | 0.2 | 0.2 | 0.2 | 0.2 | 0.2 |
| Water | Balance | Balance | Balance | Balance | Balance | Balance | Balance |
| Sum (parts by mass) | 100 | 100 | 100 | 100 | 100 | 100 | 100 |
| Volume of pigment (cm$^3$/100 g) | 4.7 | 4.7 | 4.7 | 4.7 | 4.7 | 4.7 | 4.7 |
| Volume of urethane emulsion (cm$^3$/100 g) | 0.2 | 0.4 | 0.8 | 1.7 | 3.1 | 1.2 | 4.6 |
| Volume of dispersant (cm$^3$/100 g) | 0.1 | 0.2 | 0.3 | 0.8 | 1.0 | 0.5 | 1.0 |
| Vp/(Vp + Ve) | 0.93 | 0.9 | 0.81 | 0.65 | 0.6 | 0.74 | 0.59 |

Preparation Example of Polyester Urethane Resin Liquid Dispersion

In a nitrogen-substituted container equipped with a thermometer, a nitrogen gas-introducing tube, and a stirrer, 200.4 g of polyester polyol (PTMG 1,000, average molecular weight of 1,000, manufactured by Mitsubishi Chemical Corp.), 15.7 g of 2,2-dimethylol propionic acid, 48.0 g of isophorone diisocyanate, and 77.1 g of methyl ethyl ketone as an organic solvent were caused to react using 0.06 g of dibutyltin dilaurate (DMTDL, manufactured by Tokyo Chemical Industry Co., Ltd.) as a catalyst. Four hours later, 30.7 g of methyl ethyl ketone was supplied as a diluting agent in the middle of the reaction. After continuing the reaction for 6 hours in total, 1.4 g of methanol was added to complete the reaction, thereby obtaining an organic solvent solution of urethane resin. To the organic solvent solution of urethane resin, 13.4 g of a 48 percent by mass aqueous solution of potassium hydroxide was added to neutralize the carboxyl group of the urethane resin.

Next, 715.3 g of water was added and adequately stirred, followed by aging and removal of the solvent to obtain a polyester urethane resin liquid dispersion containing resin particles having a solid content concentration of 30 percent by mass.

Preparation of Glittery Pigment Dispersion 1

To 100 g of deionized water, 66.8 g of silver nitrate, 7.2 g of a polymer dispersant having a carboxyl group (Disperbyk 190, solvent: water, 40 percent by mass nonvolatile component, acid value of 10 mg KOH/g, amine value of 0 mg KOH/g, manufactured by BYK Japan KK), and 1.8 g of cholic acid (manufactured by Wako Pure Chemical Industries, Ltd.) were added and vigorously stirred to obtain a suspension. To the thus-obtained suspension, 100 g of dimethylaminoethanol (manufactured by Wako Pure Chemical Industries, Ltd.) was gradually added such that the water temperature did not exceed 50 degrees C., and thereafter heated during stirring in a water bath at a temperature of 50 degrees C. for 3 hours to obtain a reaction liquid. The resultant reaction liquid was filtered through a glass filter (GC-90, average pore size of 0.8 μm, manufactured by ADVANTEC Corp.) to obtain a glittery pigment dispersion 1 containing 20 percent by mass of silver.

With respect to the resultant glittery pigment dispersion 1, the particle size of silver was checked with a transmission electron microscope (manufactured by JEOL Ltd.) to find out that the number average particle diameter of the primary particles was 50 nm.

The silver was in a spherical form.

Preparation of Glittery Pigment Dispersion 2

In 1 L of distilled water, 50 g of silver nitrate was dissolved to obtain a first solution. On the other hand, 22.2 g of oxalic acid was dissolved in 1 L of distilled water to obtain a second solution. The first solution and the second solution were mixed to obtain a solution mixture containing silver oxalate. Impurities were removed from the solution mixture. To 1 L of the solution mixture containing silver oxalate, 3 g of polyethylene glycol (dispersant) was added and stirred upon application of ultrasonic waves for 30 minutes so as to disperse silver oxalate to obtain a silver oxalate liquid dispersion. The thus-obtained silver oxalate liquid dispersion was charged into an autoclave and, under the condition of pressurization at 0.5 MPa and heating up to 120 degrees C., stirred for 30 minutes at a rate of 800 rpm to obtain a liquid containing particles chiefly composed of silver. The average of the arithmetic mean roughness Ra of the particles was 2.0 nm.

The liquid containing particles chiefly composed of silver was centrifuged to remove excess polyethylene glycol. The resultant precipitate was added to ethylene glycol monoethyl ether acetate (ECA) and stirred. The precipitate was taken out, and excessive ethylene glycol monoethyl ether acetate was removed by a centrifugal separator to obtain a solid. The thus-obtained solid was thermally dried at 30 degrees C. for 48 hours to obtain a silver particle-containing composition. The silver particle-containing composition contained 90 percent by mass of silver particles and 10 percent by mass of other substances (mainly ethylene glycol monoethyl ether acetate). The silver particle-containing composition was filtered through a glass filter (GC-90, average pore size of 0.8 μm, manufactured by ADVANTEC Corp.) to obtain a glittery pigment dispersion 2.

With respect to the resultant glittery pigment dispersion 2, the particle size of silver was checked with a transmission electron microscope (manufactured by JEOL Ltd.) to find out that the number average particle diameter of the primary particles was 260 nm.

The silver was in a tabular form.

Preparation of Glittery Pigment Dispersion 3

The glittery pigment dispersion 3 was obtained in the same manner as in Preparation of Glittery Pigment Dispersion 2 except that the silver oxalate liquid dispersion charged into the autoclave was stirred at 1200 rpm.

With respect to the resultant glittery pigment dispersion 3, the particle size of silver was checked with a transmission electron microscope (manufactured by JEOL Ltd.) to find out that the number average particle diameter of the primary particles was 160 nm.

The particulate was in a tabular form.

Preparation of Glittery Pigment Dispersion 4

The glittery pigment dispersion 4 was obtained in the same manner as in Preparation of Glittery Pigment Dispersion 2 except that the silver oxalate liquid dispersion charged into the autoclave was stirred at 1000 rpm.

With respect to the resultant glittery pigment dispersion 4, the particle size of silver was checked with a transmission electron microscope (manufactured by JEOL Ltd.) to find out that the number average particle diameter of the primary particles was 200 nm.

The particulate was in a tabular form.

Preparation of Glittery Pigment Dispersion 5

The glittery pigment dispersion 5 was obtained in the same manner as in Preparation of Glittery Pigment Dispersion 2 except that the silver oxalate liquid dispersion charged into the autoclave was stirred at 700 rpm.

With respect to the resultant glittery pigment dispersion 5, the particle size of silver was checked with a transmission electron microscope (manufactured by JEOL Ltd.) to find out that the number average particle diameter of the primary particles was 310 nm.

The particulate was in a tabular form.

Preparation of Glittery Pigment Dispersion 6

The glittery pigment dispersion 6 was obtained in the same manner as in Preparation of Glittery Pigment Dispersion 2 except that the silver oxalate liquid dispersion charged into the autoclave was stirred at 600 rpm.

With respect to the resultant glittery pigment dispersion 6, the particle size of silver was checked with a transmission electron microscope (manufactured by JEOL Ltd.) to find out that the number average particle diameter of the primary particles was 370 nm.

The particulate was in a tabular form.

Preparation of Glittery Pigment Dispersion 7

The glittery pigment dispersion 7 was obtained in the same manner as in Preparation of Glittery Pigment Dispersion 2 except that the silver oxalate liquid dispersion charged into the autoclave was stirred at 560 rpm.

With respect to the resultant glittery pigment dispersion 7, the particle size of silver was checked with a transmission electron microscope (manufactured by JEOL Ltd.) to find out that the number average particle diameter of the primary particles was 400 nm.

The particulate was in a tabular form.

Preparation of Glittery Pigment Dispersion 8

The glittery pigment dispersion 8 was obtained in the same manner as in Preparation of Glittery Pigment Dispersion 2 except that the silver oxalate liquid dispersion charged into the autoclave was stirred at 500 rpm.

With respect to the resultant glittery pigment dispersion 8, the particle size of silver was checked with a transmission electron microscope (manufactured by JEOL Ltd.) to find out that the number average particle diameter of the primary particles was 460 nm.

The particulate was in a tabular form.

Preparation of Glittery Pigment Dispersion 9

The glittery pigment dispersion 9 was obtained in the same manner as in Preparation of Glittery Pigment Dispersion 2 except that the silver oxalate liquid dispersion charged into the autoclave was stirred at 400 rpm.

With respect to the resultant glittery pigment dispersion 9, the particle size of silver was checked with a transmission electron microscope (manufactured by JEOL Ltd.) to find out that the number average particle diameter of the primary particles was 610 nm.

The particulate was in a tabular form.

Preparation of Glittery Pigment Dispersion 10

The glittery pigment dispersion 10 was obtained in the same manner as in Preparation of Glittery Pigment Dispersion 2 except that the silver oxalate liquid dispersion charged into the autoclave was stirred at 1500 rpm.

With respect to the resultant glittery pigment dispersion 10, the particle size of silver was checked with a transmission electron microscope (manufactured by JEOL Ltd.) to find out that the number average particle diameter of the primary particles was 100 nm.

The particulate was in a tabular form.

Preparation Example of Glittery Ink

Preparation of Glittery ink 1

Materials of the following formulation were mixed and stirred in such a manner that the total amount was 100 parts. Thereafter, the mixture was filtered through a polypropylene filter having an average pore size of 0.2 μm (Syringe filter; manufactured by Sartorius Corp.) to obtain Glittery ink 1.

Formulation of Glittery Ink 1

Glittery Pigment Dispersion 1: 50.0 parts
2,4,7,9-tetramethyldecane-4,7-diol (manufactured by Tokyo Chemical Industry Co. Ltd.): 0.5 parts
1,2-propane diol (manufactured by Tokyo Chemical Industry Co. Ltd.): 18.0 parts
3-ethyl-3-hydroxymethyl oxetane (manufactured by Tokyo Chemical Industry Co. Ltd.): 8.0 parts
Preservatives and fungicides (PROXEL LV, manufactured by AVECIA GROUP): 0.1 parts
Polyester urethane resin dispersion liquid: 5.0 parts
BYK-345 (manufactured by BYK Japan KK): 0.3 parts
Deionized water: Balance Preparation Example 2 to 10 of Glittery Ink Preparation of Glittery Inks 2 to 10

Glittery Inks 2 to 10 were obtained in the same manner as in Preparation of Glittery Ink 1 except that the formulation was changed to those shown in Table 3.

TABLE 3

| Glossy ink (component: parts by mass) | 1 | 2 | 3 | 4 | 5 | 6 | 7 | 8 | 9 | 10 |
|---|---|---|---|---|---|---|---|---|---|---|
| Glossy pigment dispersion | 1 | 2 | 3 | 4 | 5 | 6 | 7 | 8 | 9 | 10 |
| 1,2-Propanediol | 18.0 | 18.0 | 18.0 | 18.0 | 18.0 | 18.0 | 18.0 | 18.0 | 18.0 | 18.0 |
| 3-Ethyl-3-hydroxymethyloxetane | 8.0 | 8.0 | 8.0 | 8.0 | 8.0 | 8.0 | 8.0 | 8.0 | 8.0 | 8.0 |
| PROXEL LV | 0.1 | 0.1 | 0.1 | 0.1 | 0.1 | 0.1 | 0.1 | 0.1 | 0.1 | 0.1 |
| Polyester urethane resin dispersion (solid content, 30% by mass) | 5.0 | 5.0 | 5.0 | 5.0 | 5.0 | 5.0 | 5.0 | 5.0 | 5.0 | 5.0 |
| Glossy pigment dispersion | 50.0 | 12.2 | 12.2 | 12.2 | 12.2 | 12.2 | 12.2 | 12.2 | 12.2 | 12.2 |
| BYK-345 | 0.3 | 0.3 | 0.3 | 0.3 | 0.3 | 0.3 | 0.3 | 0.3 | 0.3 | 0.3 |

TABLE 3-continued

| Glossy ink (component: parts by mass) | 1 | 2 | 3 | 4 | 5 | 6 | 7 | 8 | 9 | 10 |
|---|---|---|---|---|---|---|---|---|---|---|
| 2,4,7,9-tetramethyldecane-4,7-diol | 0.5 | 0.5 | 0.5 | 0.5 | 0.5 | 0.5 | 0.5 | 0.5 | 0.5 | 0.5 |
| Water | Balance | Balance | Balance | Balance | Balance | Balance | Balance | Balance | Balance | Balance |
| Sum (parts by mass) | 100 | 100 | 100 | 100 | 100 | 100 | 100 | 100 | 100 | 100 |
| Volume of polyester resin ($cm^3$/100 g) | 1.2 | 1.2 | 1.2 | 1.2 | 1.2 | 1.2 | 1.2 | 1.2 | 1.2 | 1.2 |
| Volume of dispersant ($cm^3$/100 g) | 0.001 | 0 | 0 | 0 | 0 | 0 | 0 | 0 | 0 | 0 |
| Shape of glossy pigment | Spherical | Tabular | Tabular | Tabular | Tabular | Tabular | Tabular | Tabular | Tabular | Tabular |
| Particle size(number average particle size)of pigment: nm | 50 | 160 | 200 | 260 | 310 | 370 | 400 | 460 | 610 | 100 |

Examples 1 to 8 and 15 to 31 and Comparative Examples 1 to 5

Analog Method for White Ink and Inkjet for Glittery Ink

Using a small film forming printer (MC200, manufactured by Micro Engineering, Inc.) equipped with an anilox roll (600 lines, grid type), the white inks as set forth in Tables 4 through 7 were each applied to a transparent PET sheet LLPET 1223 (manufactured by SAKURAI CO., LTD.) as a non-porous substrate heated to 40 degrees C. in such a manner that the coating amount was 1.4 $g/m^2$ to print a solid image at 25 degrees C. with 600 lines and 100 percent duty. Thereafter, the white ink was dried at 80 degrees C. for 2 minutes.

Next, an inkjet printer (RICOH Pro L4160, manufactured by Ricoh Co., Ltd.) was used to apply, according to an inkjet method, each of the glittery inks as set forth in Tables 4 through 7 onto the white image heated to 40 degrees C. to print a solid image of 1200 dpi×1200 dpi at 25 degrees C. followed by drying. Recorded matter was thus obtained in each of Examples 1 through 8, Examples 15 through 31, and Comparative Examples 1 through 5.

Examples 9 to 12

Inkjet for White Ink and Inkjet for Glittery Ink

Using an inkjet printer (RICOH Pro L4160, manufactured by Ricoh Co., Ltd.), the white inks as set forth in Table 4 were each applied to a transparent PET sheet LLPET 1223 (manufactured by SAKURAI CO., LTD.) as a non-porous substrate heated to 40 degrees C. to print a solid image of 1200 dpi×1200 dpi at 25 degrees C.

Thereafter, each of the glittery inks as set forth in Table 4 was applied onto the white image heated to 40 degrees C. to print a solid image of 1200 dpi x 1200 dpi at 25 degrees C. followed by drying. Recorded matter for each of Examples 9 through 12 was thus obtained.

In Examples 9 through 11, two passes were interposed between the application of the white ink and the application of the glittery ink, while in Example 12, the white ink and the glittery ink were applied in the same pass.

Examples 13 and 14

The recorded matter of Examples 13 and 14 was obtained in the same manner as in Example 1 except that an aluminum foil was used as a recording medium in Example 13 and an OHP sheet (OHP film of type PPC-E A3, manufactured by Ricoh Company, Ltd.) was used as a recording medium in Example 14.

Comparative Example 6

Analog Method for White Ink and Inkjet for Glittery Ink

Using an inkjet printer (RICOH Pro L 160, manufactured by Ricoh Co., Ltd.), the glittery ink as set forth in Table 7 was applied onto the white image heated to 40 degrees C. on a transparent PET sheet (LLPET 1223, manufactured by SAKURAT CO., LTD.) as a non-porous substrate according to the inkjet method to print a solid image of 1200 dpi×1200 dpi at 25° C. followed by drying.

Using a small film forming printer (MC200, manufactured by Micro Engineering, Inc.) equipped with an anilox roll (600 lines, grid type), the white inks as set forth in Table 7 were each applied to the transparent PET in such a manner that the coating amount was 1.4 $g/m^2$ to print a solid image at 25 degrees C. with 600 lines and 100 percent duty. Thereafter, the white ink was dried at 80 degrees C. for 2 minutes. The recorded matter of Comparative Example 6 was thus obtained.

Properties of the obtained recorded matter were evaluated in the following manner. In Examples 1 through 31 and Comparative Examples 1 through 5, the surface on which the glittery image was formed was measured and in Comparative Example 6, the rear surface on which no image was formed was measured. The results are shown in Tables 4 to 7.

Evaluation of Degree of Gloss

The 20° glossiness of each recorded matter was measured by a gloss meter (Micro-TRI-gloss manufactured by BYK Gardner Corp.) and evaluated according to the following criteria. Note that grades B and higher are practically acceptable and grade A is preferable.

Evaluation Criteria

A: The 20° glossiness was 500 or more

B: The 20° glossiness was 200 or more but less than 500

C: The 20° glossiness was less than 200.

Image Clarity Evaluation

With respect to the image clarity value C of each recorded matter, a Suga tester ICM-1 model was used to measure the image clarity at an optical comb width of 2.0 mm according to the image clarity measuring method defined in JIS-H 8686 format to evaluate image clarity according to the following criteria. Note that grades B and higher are practically acceptable and grade A is preferable.

Evaluation Criteria

A: Image clarity value C was 30 or more.

B: Image clarity C of from 5 to less than 30

C: Image clarity C of less than 5

Fixability Evaluation

Each recorded matter was rubbed with a crock meter (dyed article fastness to crocking tester, manufactured by INTEC CO., LTD.) equipped with dried cotton cloth (Kanakin No. 3, manufactured by Japan Standards Association) and having a load of 400 gw, and evaluated according to the following criteria. Note that grades B and higher are practically acceptable and grade A is preferable.

Evaluation Criteria
A: The number of scratches after rubbing 50 times was less than 3
B: The number of scratches after rubbing 50 times was 3 or more but less than 5.
C: The number of scratches after rubbing 50 times was 5 or more.

Evaluation on Light Resistance

The CIE L*a*b* color coordinates of each recorded matter were measured using an X-Rite 938 spectrocolorimetric densitometer (manufactured by X-Rite Corp.) and evaluated according to the following criteria. Note that grades C and higher are practically acceptable and grades B or higher is preferable. Grade D indicates that the color was not a practical color considered to be a functionally natural silver color. The functionality of color is not constant with respect to the saturation, although it is the parameter which is desirably small, with (a*, b*)=(0, 0) being the most dominant.

Evaluation Criteria
Grade A: −0.8≤b*≤0.3 and −1.0<b*≤0.5
Grade B: −1.5≤b*≤1.5 and −1.5<b*≤1.0
Grade C: −3.5≤b*≤2.0 and −3.5≤b*≤2.0
Grade D: a*<−3.5 or 2.0<a*, or b*<−3.5 or 2.0<b*

TABLE 4

| | White ink | | Glossy ink | | | |
|---|---|---|---|---|---|---|
| | Number | Particle size (nm) | Number | Particle size (nm) | Glossiness | Image clarity |
| Example 1 | 2 | 200 | 4 | 260 | B | B |
| Example 2 | 3 | 250 | 4 | 260 | B | B |
| Example 3 | 4 | 290 | 4 | 260 | A | A |
| Example 4 | 5 | 340 | 4 | 260 | A | A |
| Example 5 | 6 | 400 | 4 | 260 | A | A |
| Example 6 | 7 | 420 | 4 | 260 | B | B |
| Example 7 | 8 | 500 | 4 | 260 | B | B |
| Example 8 | 4 | 290 | 1 | 50 | A | B |
| Example 9 | 2 | 200 | 4 | 260 | B | B |
| Example 10 | 4 | 290 | 4 | 260 | A | A |
| Example 11 | 6 | 400 | 4 | 260 | A | A |
| Example 12 | 4 | 290 | 4 | 260 | B | B |
| Example 13 | 4 | 400 | 4 | 260 | A | A |
| Example 14 | 4 | 400 | 4 | 260 | A | A |
| Example 15 | 16 | 290 | 4 | 260 | B | B |

* Particle size is the number average particle diameter.

TABLE 5

| | White ink | | Glossy ink | | | | |
|---|---|---|---|---|---|---|---|
| | Number | Particle size (nm) | Number | Particle size (nm) | Glossiness | Image clarity | Fixability |
| Example 16 | 11 | 290 | 4 | 260 | B | B | C |
| Example 17 | 12 | 290 | 4 | 260 | A | A | B |
| Example 18 | 13 | 290 | 4 | 260 | A | A | A |
| Example 19 | 4 | 290 | 4 | 260 | A | A | A |
| Example 20 | 14 | 290 | 4 | 260 | A | A | A |
| Example 21 | 15 | 290 | 4 | 260 | B | B | A |

* Particle size is the number average particle diameter.

TABLE 6

| | White ink | | Glossy ink | | | | |
|---|---|---|---|---|---|---|---|
| | Number | Particle size (nm) | Number | Particle size (nm) | Glossiness | Image clarity | Light resistance |
| Example 22 | 4 | 290 | 1 | 50 | A | B | D |
| Example 23 | 4 | 290 | 10 | 100 | A | A | D |
| Example 24 | 4 | 290 | 2 | 160 | A | A | C |
| Example 25 | 4 | 290 | 3 | 200 | A | A | B |
| Example 26 | 4 | 290 | 4 | 260 | A | A | A |
| Example 27 | 4 | 290 | 5 | 310 | A | A | A |
| Example 28 | 4 | 290 | 6 | 370 | A | A | A |
| Example 29 | 4 | 290 | 7 | 400 | B | A | A |
| Example 30 | 4 | 290 | 8 | 460 | B | A | A |
| Example 31 | 4 | 290 | 9 | 610 | B | B | A |

* Particle size is the number average particle diameter.

TABLE 7

| | White ink | | Glossy ink | | | |
|---|---|---|---|---|---|---|
| | Number | Particle size (nm) | Number | Particle size (nm) | Glossiness | Image clarity |
| Comparative Example 1 | 1 | 150 | 4 | 260 | C | C |
| Comparative Example 2 | 9 | 800 | 4 | 260 | C | C |
| Comparative Example 3 | 10 | 1000 | 4 | 260 | C | C |
| Comparative Example 4 | 17 | 290 | 4 | 260 | C | C |
| Comparative Example 5 | — | — | 4 | 260 | C | C |
| Comparative Example 6 | 4 | 290 | 4 | 260 | C | C |

* Particle size is the number average particle diameter.

Aspects of the present disclosure are, for example, as follows.

1. An image forming method comprises applying a white ink containing a metal oxide with a number average particle size of from 200 to 700 nm and a polymer to a recording medium and applying a glittery ink containing a glittery pigment to the area on the recording medium where the white ink has been applied, wherein the following relation 1 is satisfied:

0.6≤Vp/(Vp+Ve)    Relation 1.

In Relation 1, Vp represents the volume of the metal oxide in the white ink and Ve represents the volume of the polymer in the white ink.

2. The image forming method according to 1 mentioned above, wherein the following relation 2 is satisfied:

0.65≤Vp/(Vp+Ve)≤0.90    Relation 2.

3. The image forming method according to 1 or 2 mentioned above, wherein the glittery pigment is in a tabular form.

4. The image forming method according to any one of 1 to 3 mentioned above, wherein the glittery pigment contains a metal pigment having a number average particle diameter of from 100 to 610 nm.
5. The image forming method according to any one of 1 to 4 mentioned above, wherein the glittery ink contains a polymer.
6. The image forming method according to any one of 1 to 5 mentioned above, the following relation 3 is satisfied:

$$Vp \geq Ve+Ve' \qquad \text{Relation 3,}$$

where Ve' represents the volume of the polymer in the glittery ink.

7. The image forming method according to any one of 1 to 6 mentioned above, further comprises drying the white ink applied to the recording medium between the application of the white ink and the application of the glittery ink.
8. The image forming method according to any one of 1 to 7 mentioned above, the white ink and the glittery ink are applied to the recording medium by an inkjet method in different passes.
9. The image forming method according to any one of 1 to 7 mentioned above, wherein the white ink is applied by an analog printing method and the glittery ink is applied by an inkjet method.
10. An image forming device comprises a white ink containing a metal oxide with a number average particle size of from 200 to 700 nm and a polymer, a glittery ink containing a glittery pigment, a white ink application device configured to apply the white ink to a recording medium, and a glittery ink application device configured to apply the glittery ink to the area on the recording medium where the white ink has been applied, wherein the following relation 1 is satisfied:

$$0.6 \leq Vp/(Vp+Ve) \qquad \text{Relation 1.}$$

In Relation 1, Vp represents the volume of the metal oxide in the white ink and Ve represent the volume of the polymer in the white ink.

11. The image forming device according to 10 mentioned above, wherein the following relation 2 is satisfied:

$$0.65 \leq Vp/(Vp+Ve) \leq 0.90 \qquad \text{Relation 2.}$$

12. The image forming device according to 10 or 11 mentioned above, wherein the glittery pigment is in a tabular form.
13. The image forming device according to any one of 10 to 12 mentioned above, wherein the glittery pigment contains a metal pigment having a number average particle diameter of from 100 to 610 nm.
14. The image forming device according to any one of 10 to 13 mentioned above, wherein the ink contains a polymer.
15. The image forming device according to any one of 10 to 14 mentioned above, wherein the following relation 3 is satisfied:

$$Vp \geq Ve+Ve' \qquad \text{Relation 3,}$$

where Ve' represents the volume of the polymer in the glittery ink.

16. The image forming device according to any one of 10 to 15 mentioned above, further comprises drying the white ink applied to the recording medium between the application of the white ink and the application of the glittery ink.

17. The image forming device according to any one of 10 to 16 mentioned above, the white ink and the glittery ink are applied to the recording medium by an inkjet method in different passes.
18. The image forming device according to any one of 10 to 17 mentioned above, wherein the white ink is applied by an analog printing method and the glittery ink is applied by an inkjet method.
19. Recorded matter comprises an impermeable recording medium, a white image containing a metal oxide formed on an impermeable recording medium and a glittery image containing a glittery pigment formed on the white image, wherein the glittery image has a 20° glossiness of 200 or more and an image clarity value of 5 or more.

Having now fully described embodiments of the present invention, it will be apparent to one of ordinary skill in the art that many changes and modifications can be made thereto without departing from the spirit and scope of embodiments of the invention as set forth herein.

The invention claimed is:
1. An image forming method, comprising:
applying a white ink, containing a metal oxide having a number average particle diameter of from 200 to 700 nm and a polymer, to a recording medium; and
applying a glittery ink containing a glittery pigment area on the recording medium where the white ink was applied,
wherein the following relation 1 is satisfied:

$$0.6 \leq Vp/(Vp+Ve) \qquad \text{Relation 1,}$$

where Vp represents a volume of the metal oxide in the white ink and Ve represents a volume of the polymer in the white ink.

2. The image forming method according to claim 1, wherein the following relation 2 is satisfied:

$$0.65 \leq Vp/(Vp+Ve) \leq 0.90 \qquad \text{Relation 2.}$$

3. The image forming method according to claim 1, wherein the glittery pigment is in a tabular form.
4. The image forming method according to claim 1, wherein the glittery pigment contains a metal pigment having a number average particle diameter of from 100 to 610 nm.
5. The image forming method according to claim 1, wherein the glittery ink contains a polymer.
6. The image forming method according to claim 5, wherein the following relation 3 is satisfied:

$$Vp \geq Ve+Ve' \qquad \text{Relation 3,}$$

where Ve' represents a volume of the polymer in the glittery ink.

7. The image forming method according to claim 1, further comprising drying the white ink applied to the recording medium, the drying being conducted between the applying the white ink and the applying the glittery ink.
8. The image forming method according to claim 1, the white ink and the glittery ink are applied to the recording medium by an inkjet method in different passes.
9. The image forming method according to claim 1, wherein the white ink is applied by an analog printing method and the glittery ink is applied by an inkjet method.
10. An image forming device comprising:
a white ink containing a metal oxide having a number average particle diameter of from 200 to 700 nm and a polymer;
a glittery ink containing a glittery pigment;

a white ink application device configured to apply the white ink to a recording medium; and a glittery ink application device configured to apply the glittery ink to an area on the recording medium where the white ink was applied, wherein the following relation 1 is satisfied:

$$0.6 \leq Vp/(Vp+Ve) \qquad \text{Relation 1,}$$

where Vp represents a volume of the metal oxide in the white ink and Ve represents a volume of the polymer in the white ink.

11. Recorded matter comprising:

an impermeable recording medium;

a white image containing a metal oxide, which is formed on the impermeable recording medium; and a glittery image containing a glittery pigment, which is formed on the white image, wherein the glittery image has a 20° glossiness of 200 or more and an image clarity value of 5 or more.

12. The image forming method of claim 1, wherein the step of applying the glittery ink comprises applying the glittery ink directly onto the white ink.

* * * * *